US012486579B2

(12) United States Patent
Morris

(10) Patent No.: US 12,486,579 B2
(45) Date of Patent: Dec. 2, 2025

(54) SYSTEMS AND METHODS FOR TREATING A METAL SUBSTRATE

(71) Applicant: PRC-DeSoto International, Inc., Sylmar, CA (US)

(72) Inventor: Eric L. Morris, Murrieta, CA (US)

(73) Assignee: PRC-DeSoto International, Inc., Sylmar (CA)

( * ) Notice: Subject to any disclaimer, the term of this patent is extended or adjusted under 35 U.S.C. 154(b) by 810 days.

(21) Appl. No.: 16/965,938

(22) PCT Filed: Jan. 30, 2019

(86) PCT No.: PCT/US2019/015911
§ 371 (c)(1),
(2) Date: Jul. 29, 2020

(87) PCT Pub. No.: WO2019/152556
PCT Pub. Date: Aug. 8, 2019

(65) Prior Publication Data
US 2021/0040621 A1   Feb. 11, 2021

Related U.S. Application Data

(60) Provisional application No. 62/623,735, filed on Jan. 30, 2018.

(51) Int. Cl.
*C23C 22/30* (2006.01)
*C23C 22/36* (2006.01)
(Continued)

(52) U.S. Cl.
CPC ............ *C23C 22/361* (2013.01); *C23C 22/73* (2013.01); *C23C 22/83* (2013.01); *C23G 1/22* (2013.01); *C23C 2222/10* (2013.01)

(58) Field of Classification Search
CPC .................................................. C23C 2222/10
See application file for complete search history.

(56) References Cited

U.S. PATENT DOCUMENTS 3,414,489 A   12/1968   Rogers
3,647,569 A    3/1972   George
(Continued)

FOREIGN PATENT DOCUMENTS

DE   19615664 A1   10/1997
EP    0337411 A2   11/1989
(Continued)

OTHER PUBLICATIONS

Morris, U.S. Appl. No. 16/324,957, filed Feb. 12, 2019, for "System and Methods for Treating a Metal Substrate", 59 pages.
(Continued)

*Primary Examiner* — Lois L Zheng
(74) *Attorney, Agent, or Firm* — Rebeca Himena Miller

(57) ABSTRACT

Disclosed herein is a first composition comprising a trivalent chromium cation and an aqueous carrier. Also disclosed herein is a second composition comprising a permanganate anion and an aqueous carrier. Also disclosed herein is a system for treating a metal substrate comprising a first composition comprising a trivalent chromium cation and an aqueous carrier and optionally a second composition comprising a permanganate anion and an aqueous carrier. Also disclosed herein is a method of treating a metal substrate comprising contacting at least a portion of the substrate surface with a first composition comprising a trivalent chromium cation and an aqueous carrier and optionally contacting at least a portion of the substrate surface with a second composition comprising a permanganate anion and an aqueous carrier.

11 Claims, 2 Drawing Sheets

(51) Int. Cl.
  *C23C 22/73* (2006.01)
  *C23C 22/83* (2006.01)
  *C23G 1/22* (2006.01)
  *C23C 22/78* (2006.01)

(56) References Cited

U.S. PATENT DOCUMENTS

| | | |
|---|---|---|
| 3,787,326 A | 1/1974 | Deyrup |
| 3,843,430 A | 10/1974 | Kinder |
| 3,900,689 A | 8/1975 | Deyrup |
| 3,932,198 A | 1/1976 | Schneider |
| 4,169,741 A | 10/1979 | Lampatzer et al. |
| 4,349,392 A | 9/1982 | Huvar |
| 4,359,345 A | 11/1982 | Fonte, Jr. |
| 4,359,346 A | 11/1982 | Fonte, Jr. |
| 4,359,348 A | 11/1982 | Crotty |
| 4,367,099 A | 1/1983 | Lash et al. |
| 4,384,902 A | 5/1983 | Crotty et al. |
| 4,578,122 A | 3/1986 | Crotty |
| 4,749,418 A | 6/1988 | Saeki et al. |
| 4,761,189 A | 8/1988 | Mady et al. |
| 4,775,427 A | 10/1988 | Portz et al. |
| 4,963,198 A | 10/1990 | Higgins |
| 5,039,360 A | 8/1991 | Brugarolas et al. |
| 5,141,575 A | 8/1992 | Yoshitake et al. |
| 5,221,371 A | 6/1993 | Miller |
| 5,304,257 A | 4/1994 | Pearlstein et al. |
| 5,374,347 A | 12/1994 | Pearlstein et al. |
| 5,395,655 A | 3/1995 | Kazuyuki et al. |
| 5,707,465 A | 1/1998 | Bibber |
| 5,807,442 A | 9/1998 | Goodreau |
| 6,096,140 A | 8/2000 | Susa et al. |
| 6,149,735 A | 11/2000 | Oue et al. |
| 6,190,464 B1 | 2/2001 | Uchida et al. |
| 6,224,657 B1 | 5/2001 | Myers et al. |
| 6,248,181 B1 | 6/2001 | Osako et al. |
| 6,287,704 B1 | 9/2001 | Preikschat et al. |
| 6,294,262 B1 | 9/2001 | Fukuoka |
| 6,361,622 B1 | 3/2002 | Mccormick et al. |
| 6,375,726 B1 | 4/2002 | Matzdorf et al. |
| 6,461,449 B1 | 10/2002 | Matsubara et al. |
| 6,511,532 B2 | 1/2003 | Matzdorf et al. |
| 6,521,029 B1 | 2/2003 | Matzdorf et al. |
| 6,527,841 B2 | 3/2003 | Matzdorf et al. |
| 6,648,986 B1 | 11/2003 | Tang et al. |
| 6,663,700 B1 | 12/2003 | Matzdorf et al. |
| 6,669,764 B1 | 12/2003 | Matzdorf et al. |
| 6,797,387 B2 | 9/2004 | Ambrose et al. |
| 6,887,321 B2 | 5/2005 | Parkos, Jr. et al. |
| 6,946,201 B2 | 9/2005 | Preikschat et al. |
| 7,018,486 B2 | 3/2006 | Bhatia |
| 7,314,671 B1 | 1/2008 | Preikschat et al. |
| 7,432,333 B2 | 10/2008 | Duffy et al. |
| 7,452,427 B2 | 11/2008 | Morris |
| 7,470,752 B2 | 12/2008 | Duffy et al. |
| 7,691,498 B2 | 4/2010 | Kendig |
| 7,811,391 B2 | 10/2010 | Matzdorf et al. |
| 7,989,078 B2 | 8/2011 | Jaworowski et al. |
| 8,092,617 B2 | 1/2012 | Kramer et al. |
| 8,273,190 B2 | 9/2012 | Rivera |
| 8,591,670 B2 | 11/2013 | Church |
| 8,999,076 B2 | 4/2015 | Mccormick et al. |
| 9,315,902 B2 | 4/2016 | Sugiura et al. |
| 9,328,423 B2 | 5/2016 | Hashimoto |
| 9,417,018 B2 | 8/2016 | Patterson et al. |
| 9,487,866 B2 | 11/2016 | Kramer et al. |
| 9,650,521 B1 | 5/2017 | Kato et al. |
| 9,695,523 B2 | 7/2017 | Pardona et al. |
| 2002/0053301 A1 | 5/2002 | Matzdorf et al. |
| 2003/0148122 A1 | 8/2003 | Oshima et al. |
| 2003/0230215 A1 | 12/2003 | Matzdorf et al. |
| 2004/0000358 A1 | 1/2004 | Bhatia |
| 2004/0156999 A1 | 8/2004 | Biddulph et al. |
| 2005/0194574 A1 | 9/2005 | Yamamuro et al. |
| 2006/0054248 A1 | 3/2006 | Straus |
| 2006/0110619 A1 | 5/2006 | Sato |
| 2006/0191599 A1 | 8/2006 | Matzdorf et al. |
| 2006/0240191 A1 | 10/2006 | Matzdorf et al. |
| 2006/0266438 A1 | 11/2006 | Diaddario, Jr. et al. |
| 2007/0086938 A1 | 4/2007 | Kotaki et al. |
| 2007/0095436 A1 | 5/2007 | Matzdorf et al. |
| 2007/0187001 A1 | 8/2007 | Kramer et al. |
| 2007/0243397 A1 | 10/2007 | Ludwig et al. |
| 2009/0014094 A1 | 1/2009 | Kuezynski et al. |
| 2009/0045071 A1 | 2/2009 | Valko et al. |
| 2009/0242081 A1 | 10/2009 | Bauer et al. |
| 2009/0269607 A1 | 10/2009 | Watanabe et al. |
| 2010/0180793 A1 | 7/2010 | Dingwerth et al. |
| 2010/0203327 A1 | 8/2010 | Inoue et al. |
| 2011/0008645 A1 | 1/2011 | Schneider et al. |
| 2011/0070429 A1 | 3/2011 | Rochester et al. |
| 2011/0132498 A1 | 6/2011 | Nojima et al. |
| 2011/0151126 A1 | 6/2011 | Metts et al. |
| 2011/0159315 A1 | 6/2011 | Saito et al. |
| 2011/0162556 A1 | 7/2011 | Banda et al. |
| 2011/0168299 A1 | 7/2011 | Hoshino et al. |
| 2011/0217476 A1 | 9/2011 | Dingwerth et al. |
| 2011/0300406 A1 | 12/2011 | Dees |
| 2012/0091398 A1 | 4/2012 | Hofmann et al. |
| 2013/0011688 A1 | 1/2013 | Beaver |
| 2013/0040164 A1 | 2/2013 | Bhaatia et al. |
| 2013/0078382 A1 | 3/2013 | Hofmann et al. |
| 2013/0177709 A1 | 7/2013 | Ishikawa et al. |
| 2013/0177768 A1 | 7/2013 | Krueger et al. |
| 2014/0017409 A1 | 1/2014 | Kulkarni et al. |
| 2014/0120357 A1 | 5/2014 | Nixon et al. |
| 2014/0272441 A1 | 9/2014 | Kramer et al. |
| 2015/0020925 A1 | 1/2015 | Bares et al. |
| 2015/0135988 A1 | 5/2015 | Yamaguchi |
| 2015/0140338 A1 | 5/2015 | Morris |
| 2015/0225856 A1 | 8/2015 | Roth et al. |
| 2016/0032112 A1* | 2/2016 | Morris ............... C23C 22/34 106/14.12 |
| 2016/0083849 A1 | 3/2016 | Morris et al. |
| 2016/0208115 A1 | 7/2016 | Kato et al. |
| 2016/0208390 A1 | 7/2016 | Shinozaki et al. |
| 2016/0208391 A1 | 7/2016 | Shinozaki et al. |
| 2016/0272818 A1 | 9/2016 | Morris |
| 2017/0009363 A1 | 1/2017 | Hiramatsu |
| 2017/0121540 A1 | 5/2017 | Kato et al. |
| 2019/0071623 A1 | 3/2019 | Kamimura et al. |
| 2020/0354837 A1 | 11/2020 | Morris et al. |

FOREIGN PATENT DOCUMENTS

| | | |
|---|---|---|
| EP | 0337411 A3 | 5/1990 |
| EP | 1378585 A1 | 1/2004 |
| GB | 1042108 | 9/1966 |
| JP | H07126859 19 | 5/1995 |
| JP | H07126859 A | 5/1995 |
| JP | 2002332575 A | 11/2002 |
| JP | 6030791 B1 | 11/2016 |
| RU | 2248409 | 3/2005 |
| RU | 2634808 | 11/2017 |
| WO | 2013185131 | 12/2013 |
| WO | 2014151617 | 9/2014 |
| WO | 2014186286 | 11/2014 |
| WO | 2017/208749 A1 | 12/2017 |
| WO | 2018032006 A1 | 2/2018 |
| WO | 2023076990 A1 | 5/2023 |

OTHER PUBLICATIONS

Morris et al., U.S. Appl. No. 16/888,994, filed Jun. 1, 2020, for "Permanganate Based Conversion Coating Compositions", 47 pages.
Morris et al., U.S. Appl. No. 14/891,050, filed Nov. 13, 2015, for "Permanganate Based Conversion Coating Compositions", now abandoned, 51 pages.
Valko et al., U.S. Appl. No. 13/232,093, filed Sep. 14, 2011, for "Coating/Sealant Systems, Aqueous Resinous Dispersions, and Methods of Electrocoating", now U.S. Pat. No. 9,181,628, 30 pages.

(56) References Cited

OTHER PUBLICATIONS

Stoffer et al., U.S. Appl. No. 10/758,973, filed Jan. 16, 2004, for "Corrosion Resistant Coatings Containing Carbon", now U.S. Pat. No. 7,601,425, 71 pages.
Stoffer et al., U.S. Appl. No. 10/758,972, filed Jan. 16, 2004, for "Corrosion Resistant Coatings", now U.S. Pat. No. 7,759,419, 74 pages.
Stoffer et al., U.S. Appl. No. 10/346,374, filed Jan. 17, 2003, for "Corrosion Resistant Coating", now abandoned, 55 pages.
HENKEL Technical Process Bulletin dated May 9, 2019 for BONDERITE M-CR T5900 Aero (known as ALODINE T 5900), 7 pgs.
HENKEL Safety Data Sheet Issued Sep. 3, 2014 for BONDERITE M-CR T5900 Aero (known as ALODINE T 5900), 6pgs.
HENKEL Safety Data Sheet Issued Mar. 21, 2019 for BONDERITE M-Ad T5900 Aero Chromate Coating known as ALODINE T 5900 Toner, 5 pgs.

* cited by examiner

SYSTEMS AND METHODS FOR TREATING A METAL SUBSTRATE

CROSS-REFERENCE TO RELATED APPLICATION

This application claims priority to U.S. Provisional Patent Application No. 62/623,735, filed on Jan. 30, 2018, entitled "Systems and Methods for Treating a Metal Substrate," incorporated herein by reference.

FIELD OF THE INVENTION

The present invention relates to compositions, systems and methods for treating a substrate. The present invention also relates to a substrate obtainable by treatment with the systems and methods

BACKGROUND OF THE INVENTION

The oxidation and degradation of metals used in aerospace, commercial, and private industries are serious and costly problems. To prevent the oxidation and degradation of the metals used in these applications, an inorganic protective coating can be applied to the metal surface. However, at least some of the coatings prepared using these compositions and methods can develop corrosion and/or pits on the surface. Therefore, there is a need for a conversion composition and/or treatment system that overcomes several of the deficiencies, disadvantages and undesired parameters of known conversion coatings.

SUMMARY OF THE INVENTION

Disclosed herein is a first composition comprising a trivalent chromium cation and an aqueous carrier.

Also disclosed herein is a second composition comprising a permanganate anion and an aqueous carrier.

Also disclosed herein is a system for treating a metal substrate comprising a first composition comprising a trivalent chromium cation and an aqueous carrier and optionally a second composition comprising a permanganate anion and an aqueous carrier and optionally a cleaning composition comprising a hydroxide source, a phosphate source and/or a corrosion inhibitor comprising a metal cation and/or an azole.

Also disclosed herein is a method of treating a metal substrate comprising contacting at least a portion of the substrate surface with a first composition comprising a trivalent chromium cation and an aqueous carrier and optionally contacting at least a portion of the substrate surface with a second composition comprising a permanganate anion and an aqueous carrier and optionally contacting at least a portion of the substrate surface with a cleaning composition comprising a hydroxide source, a phosphate source and/or a corrosion inhibitor comprising a metal cation and/or an azole.

Also disclosed are substrates treated according to the systems and methods of the present invention.

DETAILED DESCRIPTION OF THE INVENTION

Figure 1:
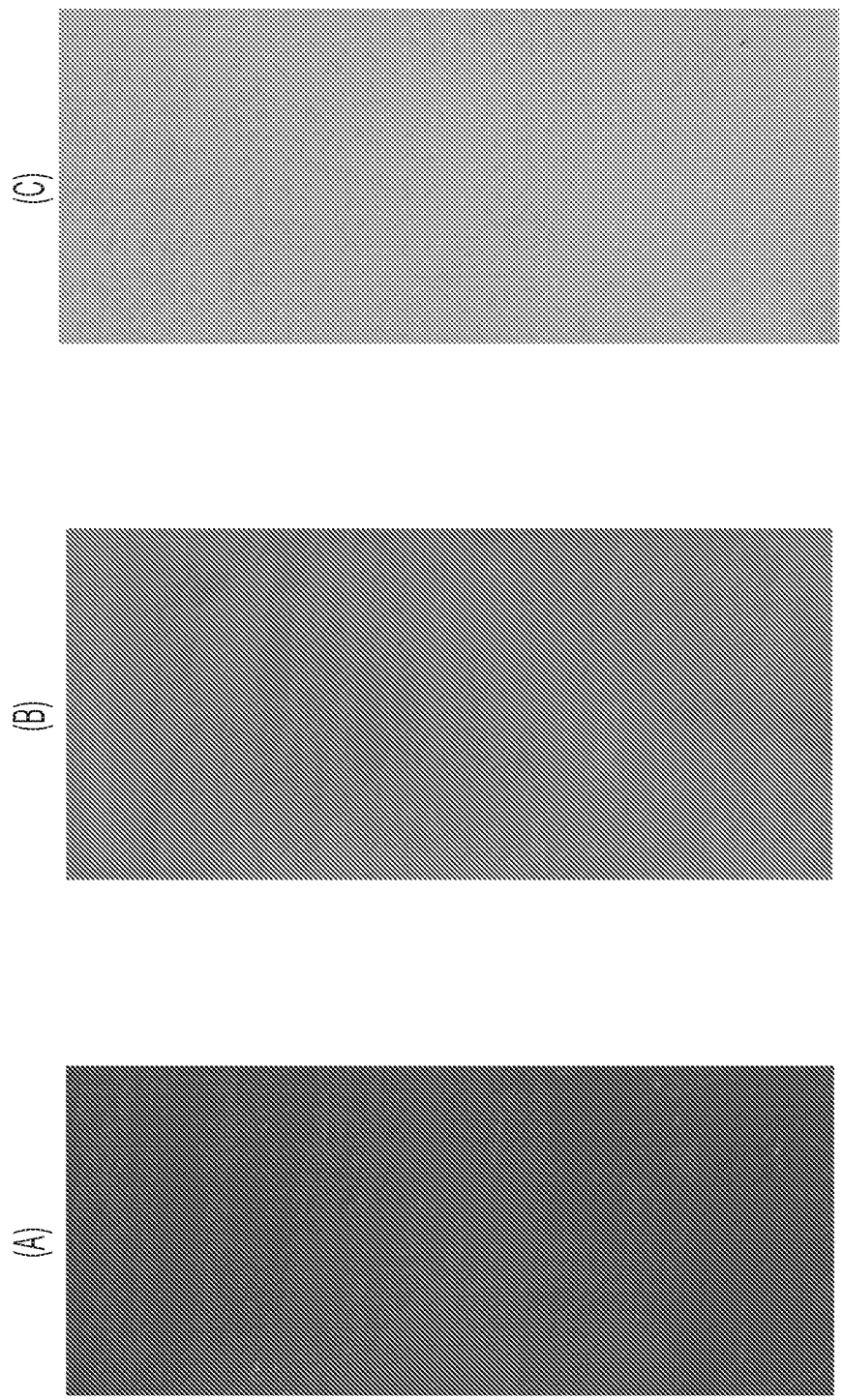
FIGS. 1(A)-1(C) show grayscale images of panels treated with a system of the present invention compared to a hexavalent chromium-containing composition (Example 2): (A) aluminum 2024-T3 substrate treated with a chromium-containing conversion composition of the present invention; (B) aluminum 2024-T3 substrate treated with a system of the present invention including a permanganate-containing conversion composition followed by a chromium-containing sealing composition; and (C) aluminum 2024-T3 substrate treated with a hexavalent-chromium containing composition.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" cleaning composition, "a" conversion composition, and "a" sealing composition, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed and/or unrecited elements, materials, ingredients and/or method steps. As used herein, "consisting of" is understood in the context of this application to exclude the presence of any unspecified element, ingredient and/or method step. As used herein, "consisting essentially of" is understood in the context of this application to include the specified elements, materials, ingredients and/or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, and/or provided on but not necessarily in contact with the surface. For example, a coating layer "formed over" a substrate does not preclude the presence of one or more other intervening coating layers of the same or different composition located between the formed coating layer and the substrate.

Unless otherwise disclosed herein, the term "substantially free," when used with respect to the absence of a particular material, means that such material, if present at all, in a composition, in a bath containing the composition, and/or in layers formed from and comprising the composition, only is present in a trace amount of 5 ppm or less based on a total weight of the composition or layer(s), as the case may be, excluding any amount of such material that may be present or derived as a result of drag-in, substrate(s), and/or dissolution of equipment. Unless otherwise disclosed herein, the term "essentially free," when used with respect to the absence of a particular material, means that such material, if present at all, in a composition, in a bath containing the composition, and/or in layers formed from and comprising the composition, only is present in a trace amount of 1 ppm or less based on a total weight of the composition or layer(s), as the case may be. Unless otherwise disclosed herein, the term "completely free," when used with respect to the absence of a particular material, means that such material, if present at all, in a composition, in a bath containing the composition, and/or in layers formed from and comprising the composition, is absent from the composition, the bath containing the composition, and/or layers formed from and comprising same (i.e., the composition, bath containing the composition, and/or layers formed from and comprising the composition contain 0 ppm of such material).

As used herein, a "salt" refers to an ionic compound made up of metal cations and non-metallic anions and having an overall electrical charge of zero. Salts may be hydrated or anhydrous.

As used herein, "aqueous composition" refers to a solution or dispersion in a medium that comprises predominantly water. For example, the aqueous medium may comprise water in an amount of more than 50 wt. %, or more than 70 wt. % or more than 80 wt. % or more than 90 wt. % or more than 95 wt. %, based on the total weight of the medium. The aqueous medium may for example consist substantially of water.

As used herein, "conversion composition" refers to a composition that is capable of reacting with and chemically altering the substrate surface and binding to it to form a film that affords corrosion protection.

As used herein, "sealing composition" refers to a composition, e.g. a solution or dispersion, that affects a substrate surface or a material deposited onto a substrate surface in such a way as to alter the physical and/or chemical properties of the substrate surface (i.e., the composition affords corrosion protection).

As used herein, the term "permanganate anion" refers to the manganate (VII) ion ($MnO_4$).

As used herein, the term "permanganate compound" refers to a compound that includes a permanganate anion.

As used herein, the term "transition metal" refers to an element that is in any of Groups IIIB to VIIIB, IB, and IIB of the CAS version of the Periodic Table of Elements as is shown, excluding the lanthanide series elements and elements 89-103, for example, in the Handbook of Chemistry and Physics, $63^{rd}$ edition (1983), corresponding to Groups 3 to 12 in the actual IUPAC numbering.

As used herein, the term "transition metal compound" refers to compounds that include at least one element that is a transition metal of the CAS version of the Periodic Table of Elements.

As used herein, the term "Group IA metal" refers to an element that is in Group IA of the CAS version of the Periodic Table of Elements as is shown, for example, in the Handbook of Chemistry and Physics, $63^{rd}$ edition (1983), corresponding to Group 1 in the actual IUPAC numbering.

As used herein, the term "Group IA metal compound" refers to compounds that include at least one element that is in Group IA of the CAS version of the Periodic Table of Elements.

As used herein, the term "Group IIA metal" refers to an element that is in Group IA of the CAS version of the Periodic Table of Elements as is shown, for example, in the Handbook of Chemistry and Physics, $63^{rd}$ edition (1983), corresponding to Group 2 in the actual IUPAC numbering.

As used herein, the term "Group IIA metal compound" refers to compounds that include at least one element that is in Group IIA of the CAS version of the Periodic Table of Elements.

As used herein, the term "Group IIIB metal" refers to yttrium and scandium of the CAS version of the Periodic Table of Elements as is shown, for example, in the Handbook of Chemistry and Physics, $63^{rd}$ edition (1983), corresponding to Group 3 in the actual IUPAC numbering. For clarity, "Group IIIB metal" expressly excludes lanthanide series elements.

As used herein, the term "Group IIIB metal compound" refers to compounds that include at least one element that is in group IBB of the CAS version of the Periodic Table of Elements as defined above.

As used herein, the term "Group IVB metal" refers to an element that is in Group IVB of the CAS version of the Periodic Table of Elements as is shown, for example, in the Handbook of Chemistry and Physics, $63^{rd}$ edition (1983), corresponding to Group 4 in the actual IUPAC numbering.

As used herein, the term "Group IVB metal compound" refers to compounds that include at least one element that is in Group IVB of the CAS version of the Periodic Table of Elements.

As used herein, the term "Group VB metal" refers to an element that is in Group VB of the CAS version of the Periodic Table of Elements as is shown, for example, in the Handbook of Chemistry and Physics, $63^{rd}$ edition (1983), corresponding to Group 5 in the actual IUPAC numbering.

As used herein, the term "Group VB metal compound" refers to compounds that include at least one element that is in Group VB of the CAS version of the Periodic Table of Elements.

As used herein, the term "Group VIB metal" refers to an element that is in Group VIB of the CAS version of the Periodic Table of Elements as is shown, for example, in the Handbook of Chemistry and Physics, $63^{rd}$ edition (1983), corresponding to Group 6 in the actual IUPAC numbering.

As used herein, the term "Group VIB metal compound" refers to compounds that include at least one element that is in Group VIB of the CAS version of the Periodic Table of Elements.

As used herein, the term "Group VIIB metal" refers to an element that is in Group VIIB of the CAS version of the Periodic Table of Elements as is shown, for example, in the Handbook of Chemistry and Physics, $63^{rd}$ edition (1983), corresponding to Group 7 in the actual IUPAC numbering.

As used herein, the term "Group VIIB metal compound" refers to compounds that include at least one element that is in Group VIIB of the CAS version of the Periodic Table of Elements.

As used herein, the term "Group IIB metal" refers to an element that is in Group IIB of the CAS version of the Periodic Table of Elements as is shown, for example, in the Handbook of Chemistry and Physics, $63^{rd}$ edition (1983), corresponding to Group 12 in the actual IUPAC numbering.

As used herein, the term "Group IIB metal compound" refers to compounds that include at least one element that is in Group IIB of the CAS version of the Periodic Table of Elements.

As used herein, the term "lanthanide series elements" refers to elements 57-71 of the CAS version of the Periodic Table of Elements and includes elemental versions of the lanthanide series elements. According to the invention, the lanthanide series elements may be those which have both common oxidation states of +3 and +4, referred to hereinafter as +3/+4 oxidation states.

As used herein, the term "lanthanide compound" refers to compounds that include at least one of elements 57-71 of the CAS version of the Periodic Table of Elements.

As used herein, the term "halogen" refers to any of the elements fluorine, chlorine, bromine, iodine, and astatine of the CAS version of the Periodic Table of Elements, corresponding to Group VILA of the CAS version of the Periodic Table of Elements.

As used herein, the term "halide" refers to compounds that include at least one halogen.

As used herein, the term "aluminum," when used in reference to a substrate, refers to substrates made of or comprising aluminum and/or aluminum alloy, and clad aluminum substrates.

Pitting corrosion is the localized formation of corrosion by which cavities or holes are produced in a substrate. The term "pit," as used herein, refers to such cavities or holes resulting from pitting corrosion and is characterized by (1) a rounded, elongated or irregular appearance when viewed normal to the test panel surface, (2) a "comet-tail", a line, or a "halo" (i.e., a surface discoloration) emanating from the pitting cavity, and (3) the presence of corrosion byproduct (e.g., white, grayish or black granular, powdery or amorphous material) inside or immediately around the pit. An observed surface cavity or hole must exhibit at least two of the above characteristics to be considered a corrosion pit. Surface cavities or holes that exhibit only one of these characteristics may require additional analysis before being classified as a corrosion pit. Visual inspection using a microscope with 10× magnification is used to determine the presence of corrosion byproducts when corrosion byproducts are not visible with the unaided eye.

Unless otherwise disclosed herein, as used herein, the terms "total composition weight", "total weight of a composition" or similar terms refer to the total weight of all ingredients being present in the respective composition including any carriers and solvents.

The present invention is directed to compositions for treating a metal substrate. A first composition may comprise, or may consist essentially of, or may consist of, a compound comprising a trivalent chromium cation; and an aqueous carrier. A second composition may comprise, or in some instances, may consist essentially of, or in some instances, may consist of, a compound comprising a permanganate anion; and an aqueous carrier. The present invention also is directed to a system for treating a metal substrate. The system may comprise, or may consist essentially of, or may consist of, the first composition. Optionally, the system may further comprise, or may consist essentially of, or may consist of, the second composition. Optionally, the system may further comprise, or may consist essentially of, or may consist of, a cleaning composition. The present invention also is directed to a method of treating a metal substrate. The method may comprise, or may consist essentially of, or may consist of, contacting at least a portion of the substrate surface with the first composition. Optionally, the method may further comprise, or may consist essentially of, or may consist of, contacting at least a portion of the substrate surface with the second composition. Optionally, the method may further comprise, or may consist essentially of, or may consist of, contacting at least a portion of the substrate surface with a cleaning composition. The contacting with the first composition may precede or follow the contacting with the second composition. As described more fully herein, in some instances, there may be rinse steps that intervene the contacting with the first composition and the second composition and/or the contacting with the cleaning composition and the first and/or the second composition. The first and second compositions each may be a sealing composition or a conversion composition, as defined herein.

Suitable substrates that may be used in the present invention include metal substrates, metal alloy substrates, and/or substrates that have been metallized, such as nickel-plated plastic. The metal or metal alloy can comprise or be steel, aluminum, zinc, nickel, and/or magnesium. For example, the steel substrate could be cold rolled steel, hot rolled steel, electrogalvanized steel, and/or hot dipped galvanized steel. Aluminum alloys of the 1XXX, 2XXX, 3XXX, 4XXX, 5XXX, 6XXX, or 7XXX series as well as clad aluminum alloys also may be used as the substrate. Aluminum alloys may comprise 0.01 wt. % copper to 10 wt. % copper. Aluminum alloys which are treated may also include castings, such as 1XX.X, 2XX.X, 3XX.X, 4XX.X, 5XX.X, 6XX.X, 7XX.X, 8XX.X, or 9XX.X (e.g., A356.0). Magnesium alloys of the AZ31B, AZ91C, AM60B, or EV31A series also may be used as the substrate. The substrate used in the present invention may also comprise titanium and/or titanium alloys, zinc and/or zinc alloys, and/or nickel and/or nickel alloys. The substrate also may comprise assemblies or multi-metal substrates. The substrate may comprise a portion of a vehicle such as a vehicular body (e.g., without limitation, door, body panel, trunk deck lid, roof panel, hood, roof and/or stringers, rivets, landing gear components, and/or skins used on an aircraft) and/or a vehicular frame. As used herein, "vehicle" or variations thereof include, but is not limited to, civilian, commercial and military aircraft, and/or land vehicles such as cars, motorcycles, and/or trucks.

As mentioned above, the first composition of the present invention may comprise a trivalent chromium compound. The trivalent chromium compound may comprise a trivalent chromium cation. The trivalent chromium compound may further comprise an anion that may be suitable for forming a salt with the trivalent chromium cation, including for example a sulfate, a nitrate, an acetate, a carbonate, a hydroxide, or combinations thereof. Suitable examples of salts of the trivalent chromium cation include but are not limited to basic chromium sulphate, chromium (III) potassium sulfate, chromium (III) sulfate hydrate, or combinations thereof. Salts of the trivalent chromium cation may be present in the first composition in their hydrated form.

The trivalent chromium cation of the trivalent chromium compound may be present in the first composition in an amount of at least 0.005 g/L, such as at least 0.01 g/L, such as at least 0.5 g/L, and in some instances, may be present in the first composition in an amount of no more than 2 g/L, such as no more than 1.5 g/L, such as no more than 1 g/L, based on total weight of the first composition. The trivalent chromium cation of the trivalent chromium compound may be present in the first composition in an amount of 0.005 g/L to 2 g/L, such as 0.01 g/L to 1.5 g/L, such as 0.5 g/L to 1 g/L, based on total weight of the first composition.

The anion suitable for forming a salt with the trivalent chromium cation may be present in the first composition in an amount of at least 0.01 g/L, such as at least 0.5 g/L, such as at least 1 g/L, based on total weight of the first composition, and in some instances, may be present in an amount of no more than 4 g/L, such as no more than 3.5 g/L, such as no more than 2 g/L. The anion suitable for forming a salt with the trivalent chromium cation may be present in the first composition in an amount of 0.01 g/L to 4 g/L, such as 0.5 g/L to 3.5 g/L, such as 1 g/L to 2 g/L, based on total weight of the first composition.

Optionally, the first composition also may comprise a metal compound comprising, for example a metal cation such as a Group I metal cation salt. In such instances, the anion forming the compound with the Group I cation may comprise, for example, a halogen, a nitrate, a sulfate, an acetate, a phosphate, a silicate (orthosilicates and metasilicates), a carbonate, a hydroxide, and the like. Optionally, the first composition also may comprise at least one coinhibitor. In examples, the coinhibitor may comprise a Group IIA metal cation, a transition metal cation, a lanthanide series cation, an azole, or combinations thereof. The lanthanide series cation may, for example, comprise cerium, praseodymium, terbium, or combinations thereof the Group IIA metal cation may comprise magnesium; the transition metal cation may comprise a Group IIIB metal cation such as yttrium, scandium, or combinations thereof, a Group IVB metal cation such as zirconium, titanium, hafnium, or combinations thereof, a Group VB metal cation such as vanadium, a Group VIB metal cation such as molybdenum, a Group VIIB metal cation such as manganese; and/or a Group IIB metal cation such as zinc. Optionally, the first composition may be substantially free, or essentially free, or completely free, of a Group IIB metal cation.

The first composition may further comprise an anion that may be suitable for forming a salt with the metal cations of the coinhibitor(s) of the first composition, such as a halogen, a nitrate, a sulfate, a phosphate, a silicate (orthosilicates and metasilicates), a carbonate, an acetate, a hydroxide, a fluoride, and the like. Accordingly, the first composition may contain sulfur-containing coinhibitors, phosphorous-containing coinhibitors, fluorine-containing coinhibitors, and the like.

The cation of the coinhibitor may be present in the first composition in an amount of at least 0.05 g/L, such as at least 0.07 g/L, such as at least 0.5 g/L, based on total weight of the first composition, and in some instances, may be present in an amount of no more than 5 g/L, such as no more than 4 g/L, such as no more than 1 g/L. The cation of the coinhibitor may be present in the first composition in an amount of 0.05 g/L to 5 g/L, such as 0.07 g/L to 4 g/L, such as 0.5 g/L to 1 g/L, based on total weight of the first composition.

The pH of the first composition may, in some instances, be less than 7, such as less than 5, such as 1.5 to 6.9, such as 2.0 to 6.0, such as 2.5 to 4.5, such as 2.8 to 4.5. The pH of the first composition may be greater than 7, such as greater than 9, such as greater than 11, such as 7.1 to 13, such as 7.5 to 11, such as 8 to 10. Regardless of whether the first composition is acidic or basic, the pH may be adjusted using, for example, any acid and/or base as is necessary. Thus, the pH of the first composition may be maintained through the inclusion of an acidic material, including water soluble and/or water dispersible acids, such as nitric acid, sulfuric acid, and/or phosphoric acid. Additionally, the pH of the composition may be maintained through the inclusion of a basic material, including water soluble and/or water dispersible bases, such as sodium hydroxide, sodium carbonate, potassium carbonate, potassium hydroxide, ammonium hydroxide, ammonia, and/or amines such as triethylamine, methylethyl amine, or mixtures thereof.

As mentioned above, the present invention may include a second composition comprising a permanganate compound. The permanganate compound may comprise a permanganate anion. The permanganate compound of the second composition may further comprise a cation that may be suitable for forming a salt with the permanganate anion, including for example a Group IA metal cation such as sodium or potassium, a Group IIA metal cation such as calcium, a Group XIB metal cation such as silver, ammonium (NH4+), or combinations thereof. Suitable examples of salts of the permanganate anion include but are not limited to potassium permanganate (KMnO4), sodium permanganate (NaMnO4), ammonium permanganate (NH4MnO4), calcium permanganate, silver permanganate, or combinations thereof. Salts of the permanganate anion may be present in their hydrated form.

The permanganate anion of the permanganate compound may be present in the second composition in an amount of at least 0.1 g/l, such as at least 0.2 g/L, such as at least 0.4 g/L, based on total weight of the second composition, and in some instances may be present in an amount of no more than 1 g/L, such as no more than 0.7 g/L, such as no more than 0.6 g/L. The permanganate anion of the permanganate compound may be present in the second composition in an amount of 0.1 g/L to 1 g/L, such as 0.2 g/L to 0.7 g/L, such as 0.4 g/L to 0.6 g/L, based on total weight of the second composition.

Optionally, the second composition may further comprise at least one coinhibitor. The coinhibitor may comprise a metal compound comprising a lanthanide series cation, a Group IIIB metal cation, a Group IVB metal cation, or combinations thereof. The lanthanide series cation may, for example, comprise cerium, praseodymium, terbium, or combinations thereof the Group IIIB metal cation may, for example, comprise yttrium, scandium, or combinations thereof and the Group IVB metal cation may, for example, comprise zirconium, titanium, hafnium, or combinations thereof.

The metal compound of the second composition may further comprise an anion that may be suitable for forming a salt with the metal cations of the coinhibitor(s) of the second composition, such as a halogen, a nitrate, a sulfate, a phosphate, a silicate (orthosilicates and metasilicates), a carbonate, an acetate, a hydroxide, a halide, a fluoride, and the like.

The metal cation of such coinhibitors may be present in the second composition in an amount of at least 0.001 g/L, such as at least 0.005 g/L, based on total weight of the second composition, and in some instances may be present in an amount of no more than 0.01 g/L, such as no more than 0.075 g/L. The metal cation of such coinhibitors may be present in the second composition in an amount of 0.001 g/L to 0.01 g/L, such as 0.005 g/L to 0.075 g/L.

The pH of the second composition may, in some instances, be less than 7, such as less than 5, such as 1.5 to 6.9, such as 2.0 to 6.0, such as 2.5 to 4.5. The pH of the second composition may be greater than 7, such as greater than 9, such as greater than 11, such as 7.1 to 13, such as 7.5 to 11, such as 8 to 10. Regardless of whether the second composition is acidic or basic, the pH may be adjusted using, for example, any acid and/or base as is necessary. Thus, the pH of the second composition may be maintained through the inclusion of an acidic material, including water soluble and/or water dispersible acids, such as nitric acid, sulfuric acid, and/or phosphoric acid. Additionally, the pH of the second composition may be maintained through the inclusion of a basic material, including water soluble and/or water dispersible bases, such as sodium hydroxide, sodium carbonate, potassium carbonate, potassium hydroxide, ammonium hydroxide, ammonia, and/or amines such as triethylamine, methylethyl amine, or mixtures thereof.

The first composition and/or the second composition may exclude hexavalent chromium or compounds that include hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When a composition and/or a coating or a layer formed from the composition is substantially free, essentially free, or completely free of hexavalent chromium, this includes hexavalent chromium in any form, such as, but not limited to, the hexavalent chromium-containing compounds listed above.

Thus, optionally, the first composition and/or the second composition and/or coatings or layers, respectively, deposited from the same may be substantially free, may be essentially free, and/or may be completely free of one or more of any of the elements or compounds listed in the preceding paragraph. A composition and/or coating or layer, respectively, formed from the same that is substantially free of hexavalent chromium or derivatives thereof means that hexavalent chromium or derivatives thereof are not intentionally added, but may be present in trace amounts, such as because of impurities or unavoidable contamination from the environment. In other words, the amount of material is so small that it does not affect the properties of the composition; in the case of hexavalent chromium, this may further include that the element or compounds thereof are not present in the compositions and/or coatings or layers, respectively, formed from the same at such a level that it causes a burden on the environment. The term "substantially free" means that the composition and/or coating or layers, respectively, formed from the same contain less than 10 ppm of any or all of the elements or compounds listed in the preceding paragraph, based on total weight of the composition or the layer, respectively, if any at all. The term "essentially free" means that the composition and/or coatings or layers, respectively, formed from the same contain less than 1 ppm of any or all of the elements or compounds listed in the preceding paragraph, if any at all. The term "completely free" means that the composition and/or coatings or layers, respectively, formed from the same contain less than 1 ppb of any or all of the elements or compounds listed in the preceding paragraph, if any at all.

The first composition and/or the second composition may exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphonates, and the like, and can include, but are not limited to, monovalent, divalent, or trivalent cations such as: sodium, potassium, calcium, zinc, nickel, manganese, aluminum and/or iron. When a composition and/or a layer or a coating formed from the composition is substantially free, essentially free, or completely free of phosphate, this includes phosphate ions or compounds containing phosphate in any form.

Thus, the first composition and/or the second composition and/or layers deposited from the same may be substantially free, or in some cases may be essentially free, or in some cases may be completely free, of one or more of any of the ions or compounds listed in the preceding paragraph. A composition and/or layer deposited from the same that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the compositions and/or layers deposited from the same at such a level that they cause a burden on the environment. The term "substantially free" means that the compositions and/or layers deposited from the same contain less than 5 ppm of any or all of the phosphate anions or compounds listed in the preceding paragraph, based on total weight of the composition or the layer, respectively, if any at all. The term "essentially free" means that the compositions and/or layers comprising the same contain less than 1 ppm of any or all of the phosphate anions or compounds listed in the preceding paragraph. The term "completely free" means that the compositions and/or layers comprising the same contain less than 1 ppb of any or all of the phosphate anions or compounds listed in the preceding paragraph, if any at all.

The first composition and the second composition each may comprise an aqueous medium and may optionally contain other materials such as nonionic surfactants and auxiliaries conventionally used in the art of conversion and/or sealing compositions. In the aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about 10% by volume, based on the total volume of aqueous medium. Additionally, in the aqueous medium, thickeners such as cellulosic, silicated, or acrylic thickeners may be present. When present, such thickeners are typically used in amounts of at least 0.00001 wt. %, such as at least 0.5 wt. %, and in some instances, no more than 5 wt. %, such as no more than 1 wt. %. When present, such thickeners are typically used in amounts of 0.00001 wt. % to 5 wt. %, such as 0.5 wt. % to 1 wt/%, based on total weight of the composition.

Other optional materials that may be included in the first composition and/or the second composition include surfactants that function as defoamers or substrate wetting agents. Anionic, cationic, amphoteric, and/or nonionic surfactants may be used. Defoaming surfactants may optionally be present at levels up to 1 wt. %, such as up to 0.1 wt. %, and wetting agents are typically present at levels up to 2 wt. %, such as up to 0.5 wt. %, based on the total weight of the first and/or second composition.

As mentioned above, the first composition and the second composition each may comprise a carrier, often an aqueous medium, so that the first composition is in the form of a solution or dispersion of the trivalent chromium compound and optionally other metal compounds and/or coinhibitors in the carrier and the second composition is in the form of a solution or dispersion of the permanganate compound and optionally coinhibitors in the carrier.

As mentioned above, the system of the present invention may comprise, consist essentially of, or consist of, any of the first compositions described above and optionally may further comprise, consist essentially of, or consist of, any of the second compositions described above. The system may optionally further comprise, consist essentially of, or consist of, a cleaning composition or a deoxidizing agent such as one of those described below.

As mentioned above, the method of the present invention may comprise, consist essentially of, or consist of, contacting at least a portion of the substrate surface with any of the first compositions described above, and optionally may further comprise, consist essentially of, or consist of, contacting at least a portion of the substrate surface with any of the second compositions described above. In an example according to the present invention, the first composition may act as a conversion composition. In an example according to the present invention, the contacting with the second composition may occur prior to the contacting with the first composition, in which case the second composition may act as a conversion composition and the first composition may act as a sealing composition.

The solution or dispersion of the first composition and/or the second composition may be brought into contact with the substrate by any of a variety of known techniques, such as dipping or immersion, spraying, intermittent spraying, dipping followed by spraying, spraying followed by dipping, brushing, or roll-coating. The solution or dispersion, when applied to the metal substrate, may be at a temperature ranging from 40° F. to 160° F., such as 60° F. to 110° F., such as 70° F. to 90° F. For example, the process may be carried out at ambient or room temperature. The contact time is often from 1 second to 30 minutes, such as 30 seconds to 15 minutes, such as 4 minutes to 10 minutes.

Following the contacting with the first composition and/or the second composition, the substrate optionally may be air dried at room temperature or may be dried with hot air, for example, by using an air knife, by flashing off the water by brief exposure of the substrate to a high temperature, such as by drying the substrate in an oven at 15° C. to 100° C., such as 20° C. to 90° C., or in a heater assembly using, for example, infrared heat, such as for 10 minutes at 70° C., or by passing the substrate between squeegee rolls. Alternatively, following the contacting with the first composition and/or the second composition, the substrate optionally may be rinsed with tap water, deionized water, reverse osmosis (RO) water and/or an aqueous solution of rinsing agents in order to remove any residue and then optionally may be dried, for example air dried or dried with hot air as described in the preceding sentence.

At least a portion of the substrate surface may be cleaned and/or deoxidized prior to contacting at least a portion of the substrate surface with the first and/or second compositions described above, in order to remove grease, dirt, and/or other extraneous matter. At least a portion of the surface of the substrate may be cleaned by physical and/or chemical means, such as mechanically abrading the surface and/or cleaning/degreasing the surface with alkaline or acidic cleaning compositions. Such cleaners are often preceded or followed by a water rinse, such as with tap water, distilled water, RO water, or combinations thereof. As used herein, "cleaning compositions" included in the treatment systems and methods of the present invention may have deoxidizing functionality in addition to degreasing characteristics and/or may eliminate the need for application of separate treatment compositions that deoxidize the substrate surface. Alternatively, the treatment systems and methods of the present invention may include cleaning compositions and deoxidizing compositions which are applied to the substrate surface in sequential steps, optionally with a rinse step(s) intervening.

As mentioned above, the cleaning composition may be alkaline and may have a pH greater than 7, such as greater than 9, such as greater than 11. The pH of the cleaning composition may be 7 to 13, such as 9 to 12.7. In other instances, the cleaning composition may be acidic and may have a pH less than 7, such as less than 6, such as less than 5.5. The pH of the cleaning composition may be 0.5 to 6, such as 1.5 to 4.5.

The cleaning composition may include commercially available alkaline cleaners, including Chemkleen™ 163, 177, 611L, 490MX, 2010LP, and 181ALP, Ultrax 32, Ultrax 97, and Ultrax 94D, each of which are commercially available from PPG Industries, Inc. (Cleveland, Ohio), and any of the DFM Series, RECC 1001, and 88X1002 cleaners commercially available from PRC-DeSoto International (Sylmar, CA), and Turco 4215-NCLT and Ridolene commercially available from Henkel Technologies (Madison Heights, MI), and any of the SOCOCLEAN series of cleaners commercially available from Socomore. Optionally, the cleaner may be substantially free, or essentially free, or completely free of borate.

The cleaning composition may comprise a hydroxide-containing and/or a phosphate-containing compound and/or a metasilicate. The hydroxide ion of the hydroxide-containing compound, if present at all, may be present in the cleaning composition in an amount of 0.05 to 25 g/1000 g solution, for example 18 to 20 g/1000 g solution based on total weight of the cleaning composition. In cleaning compositions having a phosphate-containing compound, the phosphate may comprise phosphate $(PO_4)^{3-}$, di-hydrogen phosphate $(H_2PO_4)^-$, and/or pyrophosphate $(P_2O_7)^{4-}$, for example, phosphate $(PO_4)^{3-}$ and/or pyrophosphate $(P_2O_7)^{4-}$. The phosphate may be present in the composition in an amount of 50 g/1000 g solution to 10 g/1000 g solution, for example 70 g/1000 g solution to 90 g/1000 g solution based on total weight of the cleaning composition. Other nonlimiting examples of suitable phosphate-containing compounds include organo phosphates, such as Dequest® obtainable from Monsanto (St. Louis, MO).

The cleaning composition may comprise hydrogen and/or minerals such as iron, potassium, etc. For example, the cleaning composition may comprise phosphoric acid, acetic acid, nitric acid, sulfuric acid, hydrofluoric acid, hydrochloric acid, and/or iron sulfate.

The cleaning composition may optionally comprise a corrosion inhibitor comprising a metal compound and/or an azole compound. The metal cation of the metal compound in the corrosion inhibitor (when included) may comprise various metal cations which have corrosion inhibiting characteristics. For example, the metal cation may comprise a lanthanide series element, a Group IA metal, a Group IIA metal, and/or a transition metal, such as any of those described above.

The cleaning composition may comprise a corrosion inhibitor comprising a metal cation at a concentration of at least 0.01 g/L, such as at least 0.05 g/L, such as at least 0.1 g/L, such as at least 1 g/L, and in some instances may be present in the cleaning composition at a concentration of no more than 25 g/L, such as no more than 16 g/L, such as no more than 10 g/L, such as no more than 5 g/L. The metal cation can be present in the cleaning composition at a concentration of 0.01 g/L of composition to 25 g/L of composition, such as 0.05 g/L to 16 g/L, such as 0.1 g/L to 10 g/L, such as 1 g/L to 5 g/L based on total weight of the cleaning composition. In some instances, the upper limit of the amount of the metal ion may depend on the solubility of the salt used as a source for the metal ion. As discussed in further detail below, the metal cation may be provided in the cleaning composition in the form of a metal salt.

As noted above, the metal cation may be provided in the cleaning composition in the form of a salt (i.e., a metal salt may serve as the source for the metal cation in the composition) having an anion and the metal cation as the cation of the salt. The anion of the salt may be any suitable anion capable of forming a salt with the lanthanide series element, Group IA metal, Group IIA metal, and/or transition metal. Nonlimiting examples of such anions include a carbonate, a hydroxide, a nitrate, a halogen, a sulfate, a phosphate and/or a silicate (e.g., orthosilicates and metasilicates). However, the cleaning composition may comprise at least one hydroxide-containing compound and/or phosphate-containing compound. Optionally, the cleaning composition may include at least two metal salts, and the at least two metal salts may comprise different anions and/or cations from each other. For example, the at least two metal salts may comprise different anions but the same cations, or may comprise different cations but the same anions.

As mentioned above, the cleaning composition may comprise a halogen. The halogen may be provided in the composition the form of a salt with the metal cations described above. The halogen may be present in the cleaning composition (and when the halogen is provided as a salt, the salt may be present in the composition) in an amount of at least 0.2 g/L based on total weight of the cleaning composition, and in some instances may be present in an amount of no more than 1.5 g/L based on total weight of the cleaning composition. The halogen may be present in the cleaning composition in an amount of 0.2 g/L to 1.5 g/L based on total weight of the cleaning composition. In other examples, the cleaning composition may be substantially free, or essentially free, or completely free, of halogen.

Optionally, the cleaning composition may further comprise a nitrogen-containing heterocyclic compound. The nitrogen-containing heterocyclic compound may include cyclic compounds having 1 nitrogen atom, such as pyrroles, and azole compounds having 2 or more nitrogen atoms, such as pyrazoles, imidazoles, triazoles, tetrazoles and pentazoles, 1 nitrogen atom and 1 oxygen atom, such as oxazoles and isoxazoles, or 1 nitrogen atom and 1 sulfur atom, such as thiazoles and isothiazoles. Nonlimiting examples of suitable azole compounds include 2,5-dimercapto-1,3,4-thiadiazole (CAS: 1072-71-5), 1H-benzotriazole (CAS: 95-14-7), 1H-1,2,3-triazole (CAS: 288-36-8), 2-amino-5-mercapto-1,3,4-thiadiazole (CAS: 2349-67-9), also named 5-amino-1,3,4-thiadiazole-2-thiol, and 2-amino-1,3,4-thiadiazole (CAS: 4005-51-0). In some embodiments, for example, the azole compound comprises 2,5-dimercapto-1,3,4-thiadiazole. Additionally, the nitrogen-containing heterocyclic compound may be in the form of a salt, such as a sodium salt.

The nitrogen-containing heterocyclic compound may be present in the cleaning composition in an amount of at least 0.5 g/L of cleaning composition, such as at least 1 g/L of cleaning composition, such as at least 5 g/L of composition, and in some instances may be present in an amount of no more than 15 g/L of composition, such as no more than 12 g/L of composition, such as no more than 10 g/L of composition based on total weight of the cleaning composition. The nitrogen-containing heterocyclic compound may be present in the cleaning composition in an effective corrosion inhibiting amount, for example, 0.5 g/L of composition to 15 g/L of composition, such as 1 g/L of composition to 12 g/L of composition, such as 5 g/L of composition to 10 g/L of composition based on total weight of the cleaning composition.

The cleaning composition may contain other components and/or additives such as, but not limited to, carbonates, surfactants, chelators, thickeners, allantoin, polyvinylpyrrolidone, 2,5-dimercapto-1,3,4-thiadiazole, halides, adhesion promotors, such as adhesion promoting silanes (e.g., silanes having an amine and/or hydroxyl functionality; or a zirconium alkoxide and/or a silane coupling agent) and alcohols. For example, a surfactant, if present at all, may be present in the cleaning composition in an amount of 0.015 g/1000 g solution to 60 g/1000 g solution. Surfactants suitable for use in the present invention include Dynol 604 and Carbowet™ DC01 Surfactant both commercially available from Air Products, having offices in Allentown, PA, and Triton X-100 available from The Dow Chemical Company (Midland MI).

Additionally, optionally, the additive may comprise polyvinylpyrrolidone, which, if present at all, may be present in the cleaning composition in an amount of 0.01 g/L of cleaning composition to 5 g/L of cleaning composition, for example 0.02 g/L of cleaning composition to about 1 g/L of cleaning composition.

The cleaning composition of the present invention may comprise a carrier such as water such that the cleaning composition is in the form of a solution or dispersion. The solution or dispersion may be brought into contact with the substrate by any of a variety of techniques, including, but not limited to, dip immersion, spraying, swabbing, or spreading using a brush, roller, or the like. With regard to application via spraying, conventional (automatic or manual) spray techniques and equipment used for air spraying may be used. The cleaning composition may be applied using an electrolytic-coating system. The dwell time in which the cleaning composition remains in contact with the metal substrate may vary from a few seconds to several hours, for example less than 30 minutes or 3 minutes or less.

When the cleaning composition is applied to the metal substrate by immersion, the immersion times may vary from a few seconds to several hours, for example less than 30 minutes or 3 minutes or less, such as 2 seconds. When the cleaning composition is applied to the metal substrate using a spray application, the composition may be brought into contact with at least a portion of the substrate using conventional spray application methods. The dwell time in which the cleaning composition remains in contact with the metal substrate may vary from a few seconds to several hours, for example less than 30 minutes or 3 minutes or less, such as 2 seconds.

After contacting the metal substrate with the cleaning composition, the metal substrate may optionally be air dried, and then rinsed with tap water, RO water, and/or distilled/de-ionized water. Alternately, after contacting the metal substrate with the composition, the metal substrate may be rinsed with tap water, RO water, and/or distilled/de-ionized water, and then subsequently air dried (if desired). However, the substrate need not be dried; and in some instances, drying is omitted. Additionally, as noted above, the substrate need not be rinsed, and the metal substrate may then be further coated with conversion coatings, primers and/or top coats to achieve a substrate with a finished coating. Accordingly, in some instances, this subsequent rinse may be omitted.

In some instances, the cleaning composition may be applied to a metal substrate for 1 to 10 minutes (for example, 3 to 5 minutes), and the surface of the metal substrate may be kept wet by reapplying the composition. Then, the composition is optionally allowed to dry, for example in the absence of heat greater than room temperature, for 5 to 10 minutes (for example, 7 minutes) after the last application of the composition. However, the substrate does not need to be allowed to dry; and in some instances, drying is omitted. For example, a solvent (e.g., alcohol) may be used to rinse the substrate, which allows the omission of a drying step.

After contacting the metal substrate with the cleaning composition, the metal substrate may optionally be air dried. However, the substrate need not be dried; and in some instances, drying may be omitted. A rinse is not required, but may be performed if desired.

The metal substrate optionally may be conditioned prior to or following contacting the metal substrate with the cleaning composition described above. As used herein, the term "conditioning" refers to the surface modification of the substrate prior to subsequent processing. Such surface modification can include various operations, including, but not limited to, cleaning (to remove impurities and/or dirt from the surface), deoxidizing, and/or application of a solution or coating, as is known in the art. Conditioning may have one or more benefits, such as the generation of a more uniform starting metal surface, improved adhesion to a subsequent coating on the pre-treated substrate, and/or modification of the starting surface in such a way as to facilitate the deposition of a subsequent composition.

The metal substrate may be pre-treated by solvent wiping the metal prior to applying the composition to the metal substrate. Nonlimiting examples of suitable solvents include methyl ethyl ketone (MEK), methyl propyl ketone (MPK), acetone, and the like.

The metal substrate optionally may be prepared by first solvent treating the metal substrate prior to contacting the metal substrate with the cleaning composition. As used herein, the term "solvent treating" refers to rinsing, wiping, spraying, or immersing the substrate in a solvent that assists in the removal of inks, oils, etc., that may be on the metal surface. Alternately, the metal substrate may be prepared by degreasing the metal substrate using conventional degreasing methods prior to contacting the metal substrate with the cleaning composition.

Additional optional procedures for preparing the metal substrate include the use of a surface brightener, such as an acid pickle or light acid etch, or a smut remover.

The metal substrate may be rinsed with either tap water, RO water, and/or distilled/de-ionized water between each of the cleaning, deoxidizing, and other treatment steps described above (which occur prior to contacting the substrate surface with the first and/or second compositions), and may be rinsed well with distilled/de-ionized water and/or alcohol after contact with the composition. However, as noted above, some of the above described procedures and rinses may not be necessary prior to or after application of the cleaning composition.

As mentioned above, optionally, at least a portion of the cleaned substrate surface may be deoxidized, mechanically and/or chemically. As used herein, the term "deoxidize" means removal of the oxide layer found on the surface of the substrate in order to promote uniform deposition of the first and/or second compositions (described above), as well as to promote the adhesion of the coating formed from such composition(s) to the substrate surface. Suitable deoxidizers will be familiar to those skilled in the art. A typical mechanical deoxidizer may uniformly roughen the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers available from Henkel Technologies (Madison Heights, MI), OAKITE DEOXIDIZER LNC commercially available from Chemetall, TURCO DEOXIDIZER 6 commercially available from Henkel, Socosurf deoxiders commercially available from Socomore) or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating. The skilled artisan will select a temperature range of the solution or dispersion, when applied to the metal substrate, based on etch rates, for example, at a temperature ranging from 50° F. to 150° F. (10° C. to 66° C.), such as from 70° F. to 130° F. (21° C. to 54° C.), such as from 80° F. to 120° F. (27° C. to 49° C.). The contact time may be from 30 seconds to 20 minutes, such as 1 minute to 15 minutes, such as 90 seconds to 12 minutes, such as 3 minutes to 9 minutes.

Optionally, following the contacting with the first and/or second composition, the substrate optionally may be contacted with tap water, deionized water, RO water and/or any aqueous solution known to those of skill in the art of substrate treatment, wherein such water or aqueous solution may be at a temperature of room temperature (60° F.) to 212° F. The substrate then optionally may be dried, for example air dried or dried with hot air as described in the preceding paragraph, such that the substrate surface may be partially dried, or in some instances completely dried, prior to any subsequent contact of the substrate surface with any water, solutions, compositions, or the like.

Disclosed herein is a system for treating a metal substrate comprising, or in some instances consisting essentially of, or in some instances, consisting of: a conversion composition comprising, or consisting essentially of, or consisting of, a permanganate compound; and a sealing composition comprising, or consisting essentially of, or consisting of, a trivalent chromium compound comprising a trivalent chromium cation in an amount of 0.005 g/L to 2 g/L based on total weight of the sealing composition. The system optionally may further comprise, or consist essentially of, or consist of, a cleaning composition and/or a deoxidizing composition. The cleaning composition may comprise, or consist essentially of, or consist of, a hydroxide source, a phosphate source, a corrosion inhibitor, and/or an additive. Also disclosed herein is a substrate treated with the system.

Disclosed herein is a method of treating a metal substrate comprising, or in some instances consisting essentially of, or in some instances, consisting of: contacting at least a portion of a surface of the substrate with a conversion composition comprising, or consisting essentially of, or consisting of, a permanganate compound; and contacting at least a portion of the surface contacted with the conversion composition with a sealing composition comprising, or consisting essentially of, or consisting of, a trivalent chromium compound comprising a trivalent chromium cation in an amount of 0.005 g/L to 2 g/L based on total weight of the sealing composition. The method optionally may further comprise, or consist essentially of, or consist of, contacting the substrate surface with a cleaning composition and/or a deoxidizing composition prior to contacting the surface with the conversion composition. The cleaning composition may comprise, or consist essentially of, or consist of, a hydroxide source, a phosphate source, a corrosion inhibitor, and/or an additive. Also disclosed herein is a substrate treated with the method.

Disclosed herein is a substrate treated with the systems and methods described above. It has been surprisingly discovered that a substrate treated with a conversion composition comprising a trivalent chromium-containing compound (i) exhibits at least a 25% reduction, such as at least 50% reduction, such as at least 75% reduction, in the number of pits on the substrate surface compared to a substrate not treated with the conversion composition following at least 18 days of exposure in neutral salt spray cabinet operated according to ASTM B117 and evaluated according to MIL-C-5541, such as at least 25 days of exposure and/or (ii) has fewer than 20 pits, such as fewer than 15 pits, such as fewer than 10 pits, such as fewer than 7 pits, such as fewer than 5 pits, following at least 18 days of exposure in neutral salt spray cabinet operated according to ASTM B117 and evaluated according to MIL-C-5541, such as at least 25 days of exposure. It also has been surprisingly discovered that a cleaning composition comprising a hydroxide source, a phosphate source, and/or a corrosion inhibitor may be used to clean the substrate surface prior to treatment with the conversion composition of the present invention and maintain such unexpected corrosion performance, while eliminating the need for a separate deoxidizing treatment prior to application of the conversion composition.

It also has been surprisingly discovered that a substrate treated with a conversion composition comprising a permanganate-containing compound and then treated with a seal comprising trivalent chromium-containing compound (i) exhibits at least a 25% reduction, such as at least 50% reduction, such as at least 75% reduction, in the number of pits on the substrate surface compared to a substrate not treated with the conversion composition and the sealing composition following at least 18 days of exposure in neutral salt spray cabinet operated according to ASTM B117 and evaluated according to MIL-C-5541, such as at least 25 days of exposure and/or (ii) has fewer than 20 pits, such as fewer than 15 pits, such as fewer than 10 pits, such as fewer than 7 pits, such as fewer than 5 pits, following at least 18 days of exposure in neutral salt spray cabinet operated according to ASTM B117 and evaluated according to MIL-C-5541, such as at least 25 days of exposure.

Disclosed herein is a system for treating a metal substrate comprising, or in some instances consisting essentially of, or in some instances, consisting of: a cleaning composition comprising, or consisting essentially of, or consisting of, a hydroxide source, a phosphate source, a corrosion inhibitor, and/or an additive; and a conversion composition comprising a trivalent chromium compound comprising a trivalent chromium cation in an amount of 0.005 g/L to 2 g/L based on total weight of the conversion composition. Also disclosed herein is a substrate treated with the system.

Disclosed herein is a method of treating a metal substrate comprising, or in some instances consisting essentially of, or in some instances consisting of: contacting at least a portion of a surface of the substrate with a cleaning composition comprising, or consisting essentially of, or consisting of, a hydroxide source, a phosphate source, a corrosion inhibitor, and/or an additive; and contacting at least a portion of the substrate contacted with the cleaning composition with a conversion composition comprising, or consisting essentially of, or consisting of, a trivalent chromium compound comprising a trivalent chromium cation in an amount of 0.005 g/L to 2 g/L based on total weight of the conversion composition. Also disclosed herein is a substrate treated with the method.

Disclosed herein is a substrate treated with the systems and methods described above. It has been surprisingly discovered that a substrate treated with a cleaning composition comprising, or consisting essentially of, or consisting of, a hydroxide source, a phosphate source, a corrosion inhibitor, and/or an additive and then treated with a conversion composition comprising a trivalent chromium cation in an amount of 0.005 g/L to 2 g/L based on total weight of the sealing composition exhibits at least a 25% reduction in the number of pits on the substrate surface compared to a substrate not treated with the conversion composition and the sealing composition, such as at least 50%, such as at least 75% (following at least 168 days of exposure in neutral salt spray cabinet operated according to ASTM B117 and evaluated according to MIL-C-5541). It also has been surprisingly discovered that a substrate treated with a cleaning composition comprising, or consisting essentially of, or consisting of, a hydroxide source, a phosphate source, a corrosion inhibitor, and/or an additive and then treated with a conversion composition comprising a trivalent chromium cation in an amount of 0.005 g/L to 2 g/L based on total weight of the sealing composition has fewer than 20 pits, such as fewer than 15 pits, such as fewer than 10 pits, such as fewer than 7 pits, such as fewer than 5 pits (following at least 168 days of exposure in neutral salt spray cabinet operated according to ASTM B117 and evaluated according to MIL-C-5541).

Disclosed herein is a substrate comprising, or in some instances consisting essentially of, or in some instances consisting of: a film formed from a conversion composition comprising, or in some instances consisting essentially of, or in some instances consisting of, a trivalent chromium compound.

Disclosed herein is a method of treating a substrate comprising, or in some instances consisting essentially of, or in some instances consisting of, contacting at least a portion of the substrate surface with a composition comprising, or in some instances consisting essentially of, or in some instances consisting of, a trivalent chromium compound.

Disclosed herein is a method of treating a substrate comprising, or in some instances consisting essentially of, or in some instances consisting of, contacting at least a portion of the substrate with a conversion composition comprising, or in some instances consisting essentially of, or in some instances consisting of, the second composition; and contacting the surface contacted with a sealing composition comprising the first composition.

It has been surprisingly discovered that galvanically active sites on a substrate surface treated with one of the systems and/or methods of the present invention are inactive following contact of at least one of a cleaning or deoxidizing composition (described above), the first composition, and/or the second composition, such that the chromium cation in the first composition and/or a film deposited therefrom is not oxidizable.

After the substrate is contacted with the first and/or second composition, a coating composition comprising a film-forming resin may be deposited onto at least a portion of the surface of the substrate that has been contacted with the first and/or second composition. Any suitable technique may be used to deposit such a coating composition onto the substrate, including, for example, brushing, dipping, flow coating, spraying and the like. In some instances, however, as described in more detail below, such depositing of a coating composition may comprise an electrocoating step wherein an electrodepositable composition is deposited onto a metal substrate by electrodeposition. In certain other instances, as described in more detail below, such depositing of a coating composition comprises a powder coating step. In still other instances, the coating composition may be a liquid coating composition.

The coating composition may comprise a thermosetting film-forming resin or a thermoplastic film-forming resin. As used herein, the term "film-forming resin" refers to resins that can form a self-supporting continuous film on at least a horizontal surface of a substrate upon removal of any diluents or carriers present in the composition or upon curing at ambient or elevated temperatures. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or cross-linking reactions also may be carried out under ambient conditions. Once cured or crosslinked, a thermosetting resin will not melt upon the application of heat and is insoluble in solvents. As used herein, the term "thermoplastic" refers to resins that comprise polymeric components that are not joined by covalent bonds and thereby can undergo liquid flow upon heating and are soluble in solvents.

As previously indicated, an electrodepositable coating composition comprising a water dispersible, ionic salt group-containing film-forming resin that may be deposited onto the substrate by an electrocoating step wherein the electrodepositable coating composition is deposited onto the metal substrate by electrodeposition.

The ionic salt group-containing film-forming polymer may comprise a cationic salt group-containing film-forming polymer for use in a cationic electrodepositable coating composition. As used herein, the term "cationic salt group-containing film-forming polymer" refers to polymers that include at least partially neutralized cationic groups, such as sulfonium groups and ammonium groups, that impart a positive charge. The cationic salt group-containing film-forming polymer may comprise active hydrogen functional groups, including, for example, hydroxyl groups, primary or secondary amine groups, and thiol groups. Cationic salt group-containing film-forming polymers that comprise active hydrogen functional groups may be referred to as active hydrogen-containing, cationic salt group-containing film-forming polymers. Examples of polymers that are suitable for use as the cationic salt group-containing film-forming polymer include, but are not limited to, alkyd polymers, acrylics, polyepoxides, polyamides, polyurethanes, polyureas, polyethers, and polyesters, among others.

The cationic salt group-containing film-forming polymer may be present in the cationic electrodepositable coating composition in an amount of 40 wt. % to 90 wt. %, such as 50 wt. % to 80 wt. %, such as 60 wt. % to 75 wt. %, based on the total weight of the resin solids of the electrodepositable coating composition. As used herein, the "resin solids" include the ionic salt group-containing film-forming polymer, curing agent, and any additional water dispersible non-pigmented component(s) present in the electrodepositable coating composition.

Alternatively, the ionic salt group-containing film-forming polymer may comprise an anionic salt group-containing film-forming polymer for use in an anionic electrodepositable coating composition. As used herein, the term "anionic salt group-containing film-forming polymer" refers to an anionic polymer comprising at least partially neutralized anionic functional groups, such as carboxylic acid and phosphoric acid groups that impart a negative charge. The anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference.

The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

The electrodepositable coating composition may further comprise a curing agent. The curing agent may react with the reactive groups, such as active hydrogen groups, of the ionic salt group-containing film-forming polymer to effectuate cure of the coating composition to form a coating. Non-limiting examples of suitable curing agents are at least partially blocked polyisocyanates, aminoplast resins and phenoplast resins, such as phenolformaldehyde condensates including allyl ether derivatives thereof.

The curing agent may be present in the cationic electrodepositable coating composition in an amount of 10 wt. % to 60 wt. %, such as 20 wt. % to 50 wt. %, such as 25 wt. % to 40 wt. %, based on the total weight of the resin solids of the electrodepositable coating composition. Alternatively, the curing agent may be present in the anionic electrodepositable coating composition in an amount of 10 wt. % to 50 wt. %, such as 20 wt. % to 45 wt. %, such as 25 wt. % to 40 wt. %, based on the total weight of the resin solids of the electrodepositable coating composition.

The electrodepositable coating composition may further comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof.

The electrodepositable coating composition may comprise water and/or one or more organic solvent(s). Water can, for example, be present in amounts of 40 wt. % to 90 wt. %, such as 50 wt. % to 75 wt. %, based on total weight of the electrodepositable coating composition. If used, the organic solvents may typically be present in an amount of less than 10 wt. %, such as less than 5 wt. %, based on total weight of the electrodepositable coating composition. The electrodepositable coating composition may in particular be provided in the form of an aqueous dispersion. The total solids content of the electrodepositable coating composition may be from 1 wt. % to 50 wt. %, such as 5 wt. % to 40 wt. %, such as 5 wt. % to 20 wt. %, based on the total weight of the electrodepositable coating composition. As used herein, "total solids" refers to the non-volatile content of the electrodepositable coating composition, i.e., materials which will not volatilize when heated to 110° C. for 15 minutes.

The cationic electrodepositable coating composition may be deposited upon an electrically conductive substrate by placing the composition in contact with an electrically conductive cathode and an electrically conductive anode, with the surface to be coated being the cathode. Alternatively, the anionic electrodepositable coating composition may be deposited upon an electrically conductive substrate by placing the composition in contact with an electrically conductive cathode and an electrically conductive anode, with the surface to be coated being the anode. An adherent film of the electrodepositable coating composition is deposited in a substantially continuous manner on the cathode or anode when a sufficient voltage is impressed between the electrodes. The applied voltage may be varied and can be, for example, as low as one volt to as high as several thousand volts, such as between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

Once the cationic or anionic electrodepositable coating composition is electrodeposited over at least a portion of the electroconductive substrate, the coated substrate is heated to a temperature and for a time sufficient to cure the electrodeposited coating on the substrate. For cationic electrodeposition, the coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). For anionic electrodeposition, the coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.), such as 200° F. to 210.2° F. (93° C. to 99° C.). The curing time may be dependent upon the curing temperature as well as other variables, for example, the film thickness of the electrodeposited coating, level and type of catalyst present in the composition and the like. For example, the curing time can range from 10 to 60 minutes, such as 20 to 40 minutes.

The thickness of the resultant cured electrodeposited coating may range from 2 to 50 microns.

Alternatively, as mentioned above, after the substrate has been contacted with the first and/or second composition, a powder coating composition may then be deposited onto at least a portion of the surface of the substrate. As used herein, "powder coating composition" refers to a coating composition which is completely free of water and/or solvent. Accordingly, the powder coating composition disclosed herein is not synonymous to waterborne and/or solventborne coating compositions known in the art.

The powder coating composition may comprise: (a) a film-forming polymer having a reactive functional group; and (b) a curing agent that is reactive with the functional group. Examples of powder coating compositions that may be used in the present invention include the polyester-based ENVIROCRON line of powder coating compositions commercially available from PPG Industries, Inc. or epoxy-polyester hybrid powder coating compositions. Alternative examples of powder coating compositions that may be used in the present invention include low temperature cure thermosetting powder coating compositions comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,470,752, assigned to PPG Industries Ohio, Inc. and incorporated herein by reference); curable powder coating compositions generally comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,432,333, assigned to PPG Industries Ohio, Inc. and incorporated herein by reference); and those comprising a solid particulate mixture of a reactive group-containing polymer having a $T_g$ of at least 30° C. (such as those described in U.S. Pat. No. 6,797,387, assigned to PPG Industries Ohio, Inc. and incorporated herein by reference).

After deposition of the powder coating composition, the coating is often heated to cure the deposited composition. The heating or curing operation is often carried out at a temperature in the range of from 150° C. to 200° C., such as from 170° C. to 190° C., for a period of time ranging from 10 to 20 minutes. The thickness of the resultant film is from 50 to 125 microns.

As mentioned above, the coating composition may be a liquid coating composition. As used herein, "liquid coating composition" refers to a coating composition which contains a portion of water and/or solvent. Accordingly, the liquid coating composition disclosed herein is synonymous to waterborne and/or solvent-borne coating compositions known in the art.

The liquid coating composition may comprise, for example, (a) a film-forming polymer having a reactive functional group and (b) a curing agent that is reactive with the functional group. In other examples, the liquid coating may contain a film-forming polymer that may react with oxygen in the air or coalesce into a film with the evaporation of water and/or solvents. These film-forming mechanisms may require or be accelerated by the application of heat or some type of radiation such as Ultraviolet or Infrared. Examples of liquid coating compositions that may be used in the present invention include the SPECTRACRON® line of solvent-based coating compositions, the AQUACRON® line of waterbased coating compositions, and the RAY- CRON® line of UV cured coatings all commercially available from PPG Industries, Inc.

Suitable film-forming polymers that may be used in the liquid coating composition of the present invention may comprise a (poly)ester, an alkyd, a (poly)urethane, an isocyanurate, a (poly)urea, a (poly)epoxy, an anhydride, an acrylic, a (poly)ether, a (poly)sulfide, a (poly)amine, a (poly)amide, (poly)vinyl chloride, (poly)olefin, (poly)vinylidene fluoride, (poly)siloxane, or combinations thereof.

The substrate that has been contacted with the first and/or second composition may also be contacted with a primer composition and/or a topcoat composition. The primer coat may be, for example, chromate-based primers and advanced performance topcoats. The primer coat can be a conventional chromate based primer coat, such as those available from PPG Industries, Inc. (product code 44GN072), or a chrome-free primer such as those available from PPG (DESOPRIME CA7502, DESOPRIME CA7521, Deft 02GN083, Deft 02GN084). Alternately, the primer coat can be a chromate-free primer coat, such as the coating compositions described in U.S. patent application Ser. No. 10/758,973, titled "Corrosion Resistant Coatings Containing Carbon", and U.S. patent application Ser. Nos. 10/758,972 and 10/758,972, both titled "Corrosion Resistant Coatings", all of which are incorporated herein by reference, and other chrome-free primers that are known in the art, and which can pass the military requirement of MIL-PRF-85582 Class N or MIL-PRF-23377 Class N may also be used with the current invention.

As mentioned above, the substrate of the present invention also may comprise a topcoat. As used herein, the term "topcoat" refers to a mixture of binder(s) which can be an organic or inorganic based polymer or a blend of polymers, typically at least one pigment, can optionally contain at least one solvent or mixture of solvents, and can optionally contain at least one curing agent. A topcoat is typically the coating layer in a single or multi-layer coating system whose outer surface is exposed to the atmosphere or environment, and its inner surface is in contact with another coating layer or polymeric substrate. Examples of suitable topcoats include those conforming to MIL-PRF-85285D, such as those available from PPG (Deft 03W127A and Deft 03GY292). The topcoat may be an advanced performance topcoat, such as those available from PPG (Defthane® ELT™ 99GY001 and 99W009). However, other topcoats and advanced performance topcoats can be used in the present invention as will be understood by those of skill in the art with reference to this disclosure.

The metal substrate also may comprise a self-priming topcoat, or an enhanced self-priming topcoat. The term "self-priming topcoat", also referred to as a "direct to substrate" or "direct to metal" coating, refers to a mixture of a binder(s), which can be an organic or inorganic based polymer or blend of polymers, typically at least one pigment, can optionally contain at least one solvent or mixture of solvents, and can optionally contain at least one curing agent. The term "enhanced self-priming topcoat", also referred to as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. Examples of self-priming topcoats include those that conform to TT-P-2756A. Examples of self-priming topcoats include those available from PPG (03W169 and 03GY369), and examples of enhanced self-priming topcoats include Defthane® ELT™/ESPT (product code 97GY121), available from PPG. However, other self-priming topcoats and enhanced self-priming topcoats can be used in the coating system according to the present invention as will be understood by those of skill in the art with reference to this disclosure.

The self-priming topcoat and enhanced self-priming topcoat may be applied directly to the substrate treated with the first and/or second composition. The self-priming topcoat and enhanced self-priming topcoat can optionally be applied to an organic or inorganic polymeric coating, such as a primer or paint film. The self-priming topcoat layer and enhanced self-priming topcoat is typically the coating layer in a single or multi-layer coating system where the outer surface of the coating is exposed to the atmosphere or environment, and the inner surface of the coating is typically in contact with the substrate or optional polymer coating or primer.

The topcoat, self-priming topcoat, and enhanced self-priming topcoat can be applied to the treated substrate, in either a wet or "not fully cured" condition that dries or cures over time, that is, solvent evaporates and/or there is a chemical reaction. The coatings can dry or cure either naturally or by accelerated means, for example, an ultraviolet light cured system to form a film or "cured" paint. The coatings can also be applied in a semi or fully cured state, such as an adhesive.

In addition, a colorant and, if desired, various additives such as surfactants, wetting agents or catalyst can be included in the coating composition (electrodepositable, powder, or liquid). As used herein, the term "colorant" means any substance that imparts color and/or other opacity and/or other visual effect to the composition. Example colorants include pigments, dyes and tints, such as those used in the paint industry and/or listed in the Dry Color Manufacturers Association (DCMA), as well as special effect compositions.

In general, the colorant can be present in the coating composition in any amount sufficient to impart the desired visual and/or color effect. The colorant may comprise from 1 wt. % to 65 wt. %, such as from 3 wt. % to 40 wt. % or 5 wt. % to 35 wt. %, with weight percent based on the total weight of the composition.

In view of the foregoing description, the present invention thus relates in particular, without being limited thereto, to the following Aspects 1-51:

Aspects

Aspect 1. A first composition comprising:
a trivalent chromium cation in an amount of 0.005 g/L to 2 g/L based on total weight of the composition; and
an aqueous carrier.

Aspect 2. The composition of Aspect 1, further comprising an anion suitable for forming a salt with the trivalent chromium cation.

Aspect 3. The composition of Aspect 1 or 2, wherein the composition further comprises at least one coinhibitor.

Aspect 4. The composition of Aspect 3, wherein the at least one coinhibitor comprises at least one transition metal cation.

Aspect 5. The composition of Aspect 4, wherein the transition metal cation comprises a compound comprising a Group IVB metal cation.

Aspect 6. The composition of Aspect 5, wherein the Group IVB metal cation is present in an amount of 0.05 g/L to 5 g/L based on total weight of the composition.

Aspect 7. The composition of any of the preceding Aspects, wherein the composition is substantially free of a Group IIB metal compound.

Aspect 8. The composition of any of the preceding Aspects, wherein the composition has a pH of less than 7.

Aspect 9. The composition of any of the preceding Aspects, wherein the composition has a pH of greater than 6.

Aspect 10. The composition of any of the preceding Aspects, wherein the composition is substantially free of hexavalent chromium cation.

Aspect 11. A system for treating a metal substrate comprising the first composition of any of the preceding Aspects.

Aspect 12. The system of Aspect 11, further comprising a second composition comprising a permanganate anion.

Aspect 13. The system of Aspect 12, wherein the permanganate anion is present in an amount of 0.1 g/L to 1 g/L based on total weight of the composition.

Aspect 14. The system of Aspect 12 or 13, wherein the second composition further comprises at least one coinhibitor.

Aspect 15. The system of Aspect 14, wherein the at least one coinhibitor comprises a rare earth metal cation.

Aspect 16. The system of Aspect 14 or 15, wherein the at least one coinhibitor comprises a lanthanide series element present in an amount of 0.001 g/L to 0.005 g/L based on total weight of the second composition.

Aspect 17. The system of Aspect 14 or 15, wherein the at least one coinhibitor comprises a Group IIIB metal cation present in an amount of 0.001 g/L to 0.005 g/L based on total weight of the second composition.

Aspect 18. The system of any of Aspects 11 to 17, further comprising a cleaning composition.

Aspect 19. The system of Aspect 18, wherein the cleaning composition comprises a hydroxide source and/or a phosphate source.

Aspect 20. The system of Aspect 18 or 19, wherein the cleaning composition has a pH of 7 to 13.

Aspect 21. The system of Aspect 18 or 19, wherein the cleaning composition has a pH of 0.5 to 6.

Aspect 22. The system of any of Aspects 18 to 21, wherein the cleaning composition further comprises a corrosion inhibitor comprising a metal cation and/or an azole.

Aspect 23. The system of any of Aspects 18 to 22, wherein the cleaning composition comprises a deoxidizer.

Aspect 24. The system of any of Aspects 11 to 23, wherein the system further comprises a deoxidizer.

Aspect 25. The system of Aspect 24, wherein the deoxidizer comprises a chemical deoxidizer.

Aspect 26. The system of Aspect 25, wherein the deoxidizer has a pH of greater than 7.

Aspect 27. The system of Aspect 25, wherein the deoxidizer has a pH of less than 7.

Aspect 28. The system of Aspect 25, wherein the deoxidizer has a pH of 6-8.

Aspect 29. The system of Aspect 24, wherein the deoxidizer comprises a mechanical deoxidizer.

Aspect 30. The system of any of Aspects 11 to 29, wherein the system is substantially free of hexavalent chromium.

Aspect 31. A substrate obtainable with the system of any of Aspects 11 to 30.

Aspect 32. A method of treating a substrate comprising: contacting at least a portion the substrate surface with the composition of any Aspects 1 to 9.

Aspect 33. The method of Aspect 32, further comprising contacting at least a portion of the substrate surface with a second composition comprising a permanganate anion Aspect 34. The method of Aspect 33, wherein the permanganate anion is present in an amount of 0.1 g/L to 1 g/L based on total weight of the composition.

Aspect 35. The method of Aspect 33 or 34, wherein the second composition further comprises at least one coinhibitor.

Aspect 36. The method of Aspect 35, wherein the at least one coinhibitor comprises a rare earth metal cation.

Aspect 37. The method of Aspect 35 or 36, wherein the at least one coinhibitor comprises a lanthanide series element present in an amount of 0.001 g/L to 0.005 g/L based on total weight of the second composition.

Aspect 38. The method of any of Aspects 35 to 37, wherein the at least one coinhibitor comprises a Group IIIB metal cation present in an amount of 0.001 g/L to 0.005 g/L based on total weight of the second composition.

Aspect 39. The method of any of Aspects 32 to 38, wherein the contacting with the second composition occurs prior to the contacting with the first composition.

Aspect 40. The method of any of Aspects 32 to 39, further comprising contacting at least a portion of a surface of the substrate with a cleaning composition; wherein the contacting with the cleaning composition occurs prior to the contacting with the second composition.

Aspect 41. The method of any of Aspects 32 to 40, further comprising contacting at least a portion of the substrate surface with a deoxidizing composition.

Aspect 42. The method of any of Aspects 32 to 41, further comprising mechanically deoxidizing at least a portion of the substrate surface.

Aspect 43. The method of any of Aspects 32 to 42, wherein the substrate surface is not contacted with a deoxidizing composition.

Aspect 44. A substrate obtainable by the method of any of Aspects 32 to 43.

Aspect 45. The substrate of Aspect 31 or 44, wherein the substrate contacted with the first composition and/or the second composition has at least a 25% reduction in the number of pits on the substrate surface compared to a substrate not treated with the first composition following at least 18 days of exposure in neutral salt spray cabinet operated according to ASTM B117 and evaluated according to MIL-C-5541.

Aspect 46. The substrate of Aspect 31 or 44, wherein the substrate contacted with the first composition and/or the second composition has at least a 25% reduction in the number of pits on the substrate surface compared to a substrate not treated with the first composition following at least 25 days of exposure in neutral salt spray cabinet operated according to ASTM B117 and evaluated according to MIL-C-5541.

Aspect 47. The substrate of Aspect 31 or 44, wherein the substrate contacted with the first composition and/or the second composition has fewer than 20 pits on the substrate surface compared to a substrate not treated with the first composition following at least 18 days of exposure in neutral salt spray cabinet operated according to ASTM B117 and evaluated according to MIL-C-5541.

Aspect 48. The substrate of Aspect 31 or 44, wherein the substrate contacted with the first composition and/or the second composition has fewer than 20 pits on the substrate surface compared to a substrate not treated with the first composition following at least 25 days of exposure in neutral salt spray cabinet operated according to ASTM B117 and evaluated according to MIL-C-5541.

Aspect 49. The substrate of any of Aspects 31 or 44 to 48, wherein a film formed on a surface of the substrate by the first composition is substantially free of hexavalent chromium.

Aspect 50. The substrate of any of Aspects 31 or 43 to 49, wherein a surface of the substrate comprises inactive galvanic sites.

Aspect 51. The substrate of any of Aspects 31 or 43 to 50, wherein the chromium cation in the first composition and/or a film deposited therefrom is not oxidizable.

Whereas particular features of the present invention have been described above for purposes of illustration, it will be evident to those skilled in the art that numerous variations of the details of the coating composition, coating, and methods disclosed herein may be made without departing from the scope in the appended claims.

Illustrating the invention are the following examples that are not to be considered as limiting the invention to their details. All parts and percentages in the examples, as well as throughout the specification, are by weight unless otherwise indicated.

EXAMPLES

Materials Used in Examples:
  Potassium Permanganate, ACS, 99.0% (Alfa Aesar, CAS #7722-64-7, Lot #E02R022);
  Potassium Hexafluorozirconate (Sigma Aldrich, CAS #16923-95-8, Lot #MKBM7151V);
  Zinc sulfate heptahydrate, ACS, 99.0-103.0% (Alfa Aesar, CAS #7446-20-0, Lot #F28Q41);
  Basic Chromium sulphate (Treibacher Industrie AG, CAS #39380-78-4, Lot #FM4605);
  Chromium (III) potassium sulfate dodecahydrate, ACS reagent>=98%, (Sigma-Aldrich, CAS #7788-99-0, Lot #MKBZ9716V);
  Sodium hydroxide pellets (98%), Alfa Aesar (Ward Hill, MA);
  Sodium phosphate dodecahydrate, 97%, Alfa Aesar;
  Polyvinylpyrrolidone (PVP), 8000 m.w., Alfa Aesar;
  Allantoin, 98%, Alfa Aesar;
  2,5-dimercapto-1,3,4-thiadiazole, 98%, Acros Organics (Geel, Belgium);
  Carbowet GA100, 100%, Air Products (Cleveland, Ohio), a non-ionic surfactant;
  Cerium (III) nitrate solution (Prochem, Inc., Lot #08254); and
  Yttrium (III) nitrate solution (Prochem, Inc., Lot #08254).

Potassium Permanganate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 4.5028 g of potassium permanganate, dark purple solid was weighed using an Adventurer Pro AV264 scale and transferred to the beaker. Then, 1195.5 g of deionized water was added into the beaker. The beaker was then placed on a Cole-Parmer StableTemp Ceramic Stirrer (Model No. 03406-10), and the solution was stirred slow to medium until all the solid was fully dissolved.

Cerium (III) Nitrate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VWR 5.0 oz specimen container and a disposable plastic pipette, 0.1263 g of cerium (III) nitrate solution was weighed using the Adventurer Pro AV264 scale and transferred to the beaker. Then, 600.0 g of deionized water was added into the beaker and mixed well on the stir plate described above.

Yttrium (III) Nitrate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VWR 5.0 oz specimen container and a disposable plastic pipette, 0.2124 g of yttrium (III) nitrate solution was weighed using the Adventurer Pro AV264 scale and transferred to the beaker. Then, 500.0 g of deionized water was added into the beaker and mixed well on the stir plate described above.

Chromium (III) Potassium Sulfate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 10.0000 g of chromium (III) potassium sulfate dodecahydrate was weighed using the Adventurer Pro AV264 scale and transferred to the beaker. Then, 1590.0 g of deionized water was added into the beaker. The beaker was then placed on the stir plate described above, and the solution was stirred slow to medium until all the solid was fully dissolved.

Basic Chromium (III) Sulfate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 10.0070 g of basic chromium (III) sulfate, dark green powder was weighed using the Adventurer Pro AV264 scale and transferred to the beaker. Then, 1590.0 g of deionized water was added into the beaker. The beaker was then placed on the stir plate described above, and the solution was stirred slow to medium until all the solid was fully dissolved.

Potassium Hexafluorozirconate Stock Solution

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 9.0041 g of potassium hexafluorozirconate, white crystallized solid was weighed using the Adventurer Pro AV264 scale and transferred to the beaker. Then, 1191.0 g of deionized water was added into the beaker. The beaker was then placed on the stir plate described above, and the solution was stirred slow to medium until all the solid was fully dissolved.

Compositions #2-#4

Compositions #2-#4 were prepared by mixing the stock solutions described above with deionized water in the amounts shown in Table 1 under mild agitation using the stir plate described above.

TABLE 1

| | Compositions #2-#4 | | | | |
|---|---|---|---|---|---|
| | Potassium Permanganate Stock Solution (g) | Cerium (III) Nitrate Stock Solution (g) | Yttrium (III) Nitrate Stock Solution (g) | Deionized Water (g) | Total Volume (g) |
| Composition #2 | 200.0 | — | — | 800.0 | 1000.0 |
| Composition #3 | 200.0 | 200.0 | — | 600.0 | 1000.0 |
| Composition #4 | 200.0 | 100.0 | 50.0 | 650.0 | 1000.0 |

Composition #5

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 0.0427 g of potassium hexafluorozirconate, white crystalized solid was weighed by Adventurer Pro AV264 scale and transferred to the beaker. Then, 800.0 g of deionized water was added into the beaker. The beaker was then placed on the stir plate described above and was stirred slow to medium until all the solid was fully dissolved. After potassium hexafluorozirconate was fully dissolved, 200.0 g of potassium permanganate stock solution was added into the same beaker and mixed well.

Composition #6

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 0.0422 g of zinc sulfate heptahydrate, white crystallized solid was weighed by Adventurer Pro AV264 scale and transferred to the beaker. Then, 800.0 g of deionized water was added into the beaker. The beaker was then placed on the stir plate described above and was stirred slow to medium until all the solid was fully dissolved. After the zinc sulfate heptahydrate was fully dissolved, 200.0 g of potassium permanganate stock solution was added into the same beaker and mixed well.

Composition #7

A 2 L of glass beaker and a stir bar were rinsed with deionized water and solvent (MEK) wiped twice, and then dried with a clean paper towel. The beaker was placed on an Adventurer Pro AV8101 weighing scale and the weighing scale was tared to zero. Using a VMP piece of weighing paper (4×4, 12578-165), 0.0422 g of sodium phosphate dodecahydrate was weighed by Adventurer Pro AV264 scale and transferred to the beaker. Then, 800.0 g of deionized water was added into the beaker. The beaker was then placed on the stir plate described above and was stirred slow to medium until all the solid was fully dissolved. After the sodium phosphate dodecahydrate was fully dissolved, 200.0 g of potassium permanganate stock solution was added into the same beaker and mixed well.

Compositions #8-#11

Compositions #8-#11 were prepared using the stock solutions described above in the amount shown in Table 2 in deionized water in the amount shown under mild agitation using the stir plate described above.

TABLE 2

| | Compositions #8-#11 | | | | |
|---|---|---|---|---|---|
| | Chromium (III) Potassium Sulfate dodecahydrate Stock Solution (g) | Basic Chromium (III) sulfate Stock Solution (g) | Potassium Hexafluoro zirconate Stock Solution (g) | Deionized Water (g) | Total Volume (g) |
| Composition #8 | 400.0 | — | — | 600.0 | 1000.0 |
| Composition #9 | — | 400.0 | — | 600.0 | 1000.0 |
| Composition #10 | 400.0 | — | 200.0 | 400.0 | 1000.0 |
| Composition #11 | — | 400.0 | 200.0 | 400.0 | 1000.0 |

TABLE 3

Cleaning Composition #12

| INGREDIENTS | % BY WEIGHT |
|---|---|
| sodium hydroxide pellets, 98% | 1.6 |
| sodium phosphate dodecahydrate, 97% | 6.3 |
| polyvinylpyrrolidone (PVP), 8000 m.w. | 0.02 |
| Allantoin, 98% | 0.03 |
| 2,5-dimercapto-1,3,4-thiadiazole(DMTD), 98% | 1.00 |
| Carbowet GA100 | 4.1 |
| deionized water | 98.7 |

The ingredients used to prepare cleaning Composition #12 are provided in Table 3. Sodium hydroxide and sodium phosphate were completely dissolved in deionized water under mild mechanical agitation using a stir plate (VWR, 7×7 CER HOT/STIR). Next, the PVP was stirred in until dissolved, and then Allantoin was added and stirred until dissolved, and then the DMTD was added and stirred until dissolved. After the DMTD was completely dissolved, Carbowet GA100 was stirred in under mild mechanical agitation.

Neutral Salt Spray Testing

For each experiment described below, panels were placed in a neutral salt spray cabinet operated according to ASTM B 117 for the time period indicated. Corrosion performance was evaluated according to MIL-C-5541, where any pits near the edges, scratches, metal defects or processing clamp holding areas were omitted/not counted. Data are reported in Tables 4-8.

Example 1

Panel Preparation—Example 1A

Twenty-one aluminum 2024-T3 bare substrates each measuring 3"×10"×0.032" (Priority Metals, Orange County, CA) were each hand-wiped with methyl ethyl ketone (100%) and a disposable cloth twice on each side. Each panel was allowed to air dry prior to chemical cleaning. Then, each panel was immersed in SocoMore degreaser (SocoClean A3432) for 6 minutes at 127° F. with medium agitation. The panel was then spray rinsed for 30 seconds and immersion rinsed for 2 minutes and then was immersed into SocoMore deoxidizer (SocoSurf A1858/1806) for 6 minutes at room temperature with no agitation. The panel was then carefully dipped into two extra immersion rinsing tanks, and the panel was spray rinsed for 30 seconds and immersion rinsed for 2 minutes. Then, three panels were immersed in a bath containing either Composition #1 (a bath containing Alodine 1200, a hexavalent chromium-containing conversion composition commercially available from Henkel AG & Co., prepared according to manufacturer's instructions) or one of Compositions #2-#7 (described above) for 2 minutes (i.e., panels were run in triplicate per bath). Each panel was then immersed into two separate immersion rinsing tanks for 2 minutes each tank. Finally, each panel was dried on a plastic tray at ambient conditions overnight prior to neutral salt spray testing for 18 days. Data are reported in Table 4.

TABLE 4

Corrosion performance of panels treated in Example 1A following 18 days of neutral salt spray

| Cleaning Composition | Deoxidizing Composition | Permanganate Composition | Trivalent Chromium Composition | 18 Days NSS/ Average Pits or % Corroded (Triplicates) |
|---|---|---|---|---|
| SocoMore | SocoMore | — | Composition #1 | Avg. 7 Pits |
| SocoMore | SocoMore | Composition #2 | — | All panels >90% Corroded |
| SocoMore | SocoMore | Composition #3 | — | All panels >90% Corroded |
| SocoMore | SocoMore | Composition #4 | — | All panels >90% Corroded |
| SocoMore | SocoMore | Composition #5 | — | All panels >90% Corroded |
| SocoMore | SocoMore | Composition #6 | — | All panels >90% Corroded |
| SocoMore | SocoMore | Composition #7 | — | All panels >90% Corroded |

The data shown in Table 4 demonstrate that alkaline cleaning and deoxidation of panels with commercially available cleaners and deoxidizers followed by treatment with a permanganate composition (with or without corrosion inhibitors) does not protect against corrosion following 18 days in neutral salt spray. The comparative (Composition #1) was a commercially available hexavalent chromium-containing composition.

Panel Preparation—Example 1B

Twelve aluminum 2024-T3 bare substrates each measuring 3"×10"×0.032" (Priority Metals, Orange County, CA) were each hand-wiped with methyl ethyl ketone (100%) and a disposable cloth twice on each side. Each panel was allowed to air dry prior to chemical cleaning. Then, each panel was immersed in SocoMore degreaser (SocoClean A3432) for 6 minutes at 127° F. with medium agitation. Each panel was then spray rinsed for 30 seconds and immersion rinsed for 2 minutes and then was immersed into SocoMore deoxidizer (SocoSurf A1858/1806) for 6 minutes at room temperature with no agitation. Each panel was then carefully dipped into two extra immersion rinsing tanks, and the panel was spray rinsed for 30 seconds and immersion rinsed for 2 minutes. Then, three panels were immersed in a bath containing one of Compositions #8-#11 for 5 minutes (i.e., panels were run in triplicate per bath). Each panel was then immersed into two separate immersion rinsing tanks for 2 minutes each tank. Finally, each panel was dried on a plastic tray at ambient conditions overnight prior to neutral salt spray testing for 18 days. Data are reported in Table 5.

An additional twenty aluminum 2024-T3 bare substrates each measuring 3"×10"×0.032" (Priority Metals, Orange County, CA) were each hand-wiped with methyl ethyl ketone (100%) and a disposable cloth twice on each side. Each panel was allowed to air dry prior to chemical cleaning. Then, each panel was immersed in SocoMore degreaser (SocoClean A3432) for 6 minutes at 127° F. with medium agitation. Each panel was then spray rinsed for 30 seconds and immersion rinsed for 2 minutes and then was immersed into SocoMore deoxidizer (SocoSurf A1858/1806) for 6 minutes at room temperature with no agitation. Each panel was then carefully dipped into two extra immersion rinsing tanks, and the panel was spray rinsed for 30 seconds and immersion rinsed for 2 minutes. Then, ten panels were immersed in a bath containing one of Compositions #10 or #11 for 5 minutes (i.e., panels were run in sets of 10 per bath). Each panel was then immersed into two separate immersion rinsing tanks for 2 minutes each tank. Finally, each panel was dried on a plastic tray at ambient conditions overnight prior to neutral salt spray testing for 25 days. Data are reported in Table 6.

An additional twenty aluminum 2024-T3 bare substrates each measuring 3"×10"×0.032" (Priority Metals, Orange County, CA) were each hand-wiped with methyl ethyl ketone (100%) and a disposable cloth twice on each side. Each panel was allowed to air dry prior to chemical cleaning. Then, each panel was immersed in cleaning Composition #12 for 6 minutes at 127° F. with medium agitation. Each panel was then spray rinsed for 30 seconds and immersion rinsed for 2 minutes. Then, ten panels were immersed in a bath containing one of Compositions #10 or #11 for 5 minutes (i.e., panels were run in sets of 10 per bath). Each panel was then immersed into two separate immersion rinsing tanks for 2 minutes each tank. Finally, each panel was dried on a plastic tray at ambient conditions overnight prior to neutral salt spray testing for 25 days. Data are reported in Table 6.

TABLE 5

Corrosion performance of panels treated in Example 1B following 18 days of neutral salt spray exposure

| Cleaning Composition | Deoxidizing Composition | Permanganate Composition | Trivalent Chromium Composition | 18 Days NSS/ Average Pits or % Corroded (Triplicates) |
|---|---|---|---|---|
| SocoMore | SocoMore | — | Composition #8 | All panels >90% Corroded |
| SocoMore | SocoMore | — | Composition #9 | All panels >90% Corroded |
| SocoMore | SocoMore | — | Composition #10 | Avg. 0 Pits |
| SocoMore | SocoMore | — | Composition #11 | Avg. 2.7 Pits |

TABLE 6

Corrosion performance of panels treated in Example 1B following 25 days of neutral salt spray exposure

| Cleaning Composition | Deoxidizing Composition | Permanganate Composition | Trivalent Chromium Composition | 25 Days NSS/ Average Pits or % Corroded (10 panels) |
|---|---|---|---|---|
| SocoMore | SocoMore | — | Composition #10 | Avg. 1.0 Pits |
| SocoMore | SocoMore | — | Composition #11 | Avg. 0.1 Pits |
| Composition #12 | — | — | Composition #10 | Avg. 3.5 Pits |
| Composition #12 | — | — | Composition #11 | Avg. 0.1 Pits |

The data shown in Tables 5 and 6 demonstrate that alkaline cleaning and deoxidation of panels followed by treatment with a trivalent chromium conversion composition containing potassium hexafluorzirconate significantly improves corrosion performance compared to a composition containing only trivalent chromium. The data also demonstrate that panels treated with the trivalent chromium compositions of the present invention perform at least as well or better than panels treated with Alodine (Composition #1, Table 4), a hexavalent-chromate containing composition. The data also demonstrate that cleaning panels with cleaning Composition #12 followed by treatment with a trivalent chromium conversion composition containing potassium hexafluorzirconate maintains the improved corrosion performance while eliminating the need for separate cleaning and deoxidizing treatments.

Panel Preparation—Example 1C

Twelve aluminum 2024-T3 bare substrates each measuring 3"×10"×0.032" (Priority Metals, Orange County, CA) were hand-wiped with methyl ethyl ketone (100%) and a disposable cloth twice on each side and was allowed to air dry prior to chemical cleaning. First, each panel was immersed in SocoMore degreaser (SocoClean A3432) for 6 minutes at 127° F. with medium agitation. Then, each panel was spray rinsed for 30 seconds and immersion rinsed for 2 minutes. Second, each panel was immersed into SocoMore deoxidizer (SocoSurf A1858/1806) for 6 minutes at room temperature with no agitation. Each panel was then carefully dipped into two extra immersion rinsing tanks to remove most of deoxidizer, and the panel was spray rinsed for 30 seconds and immersion rinsed for 2 minutes to remove the residue deoxidizer. Third, each panel was immersed into Composition #2 for 2 minutes. Each panel was then immersed into two separate immersion rinsing tanks for 2 minutes each tank. Then, three panels were immersed in a bath containing one of Compositions #8-#11 for 5 minutes (i.e., panels were run in triplicate per bath). Each panel was then immersion rinsed into two separate immersion rinsing tanks for 2 minutes each tank. Finally, each panel was dried on a plastic tray in the laboratory overnight before neutral salt spray testing for 18 days. Data are reported in Table 7.

An additional twenty aluminum 2024-T3 bare substrates each measuring 3"×10"×0.032" (Priority Metals, Orange County, CA) each were hand-wiped with methyl ethyl ketone (100%) and a disposable cloth twice on each side and were allowed to air dry prior to chemical cleaning. First, each panel was immersed in SocoMore degreaser (SocoClean A3432) for 6 minutes at 127° F. with medium agitation. Each panel was then spray rinsed for 30 seconds and immersion rinsed for 2 minutes. Second, each panel was immersed into SocoMore deoxidizer (SocoSurf A1858/1806) for 6 minutes at room temperature with no agitation. Each panel was then carefully dipped into two extra immersion rinsing tanks to remove most of deoxidizer, and was spray rinsed for 30 seconds and immersion rinsed for 2 minutes to remove the residue deoxidizer. Third, each panel was immersed into Composition #2 for 2 minutes. Each panel was then immersed into two separate immersion rinsing tanks for 2 minutes each tank. Next, ten panels were immersed in a bath containing one of Compositions #8-#11 for 5 minutes (i.e., panels were run in sets of 10 per bath). Each panel was then immersed into two separate immersion rinsing tanks for 2 minutes each tank. Finally, each panel was dried on a plastic tray at ambient conditions overnight prior to neutral salt spray testing for 25 days. Data are reported in Table 8.

TABLE 7

Corrosion performance of panels treated in Example 1C following 18 days of neutral salt spray exposure

| Cleaning Composition | Deoxidizing Composition | Permanganate Composition | Trivalent Chromium Composition | 18 Days NSS/ Average Pits or % Corroded (Triplicates) |
| --- | --- | --- | --- | --- |
| SocoMore | SocoMore | Composition #2 | Composition #8 | >90% Corroded |
| SocoMore | SocoMore | Composition #2 | Composition #9 | >90% Corroded |
| SocoMore | SocoMore | Composition #2 | Composition #10 | >20 Pits |
| SocoMore | SocoMore | Composition #2 | Composition #11 | 6.33 Pits |

TABLE 8

Corrosion performance of panels treated in Example 1C following 25 days of neutral salt spray exposure

| Cleaning Composition | Deoxidizing Composition | Permanganate Composition | Trivalent Chromium Composition | 25 Days NSS/ Average Pits (Ten Panels) |
| --- | --- | --- | --- | --- |
| SocoMore | SocoMore | Composition #2 | Composition #10 | Avg. 2.1 Pits |
| SocoMore | SocoMore | Composition #2 | Composition #11 | Avg. 0.0 Pits |

The data shown in Tables 7 and 8 demonstrate that treatment of panels with a permanganate conversion composition does not interfere with corrosion performance of panels treated with a trivalent chromium sealing composition containing potassium hexafluorzirconate.

Example 2

Figure 2:
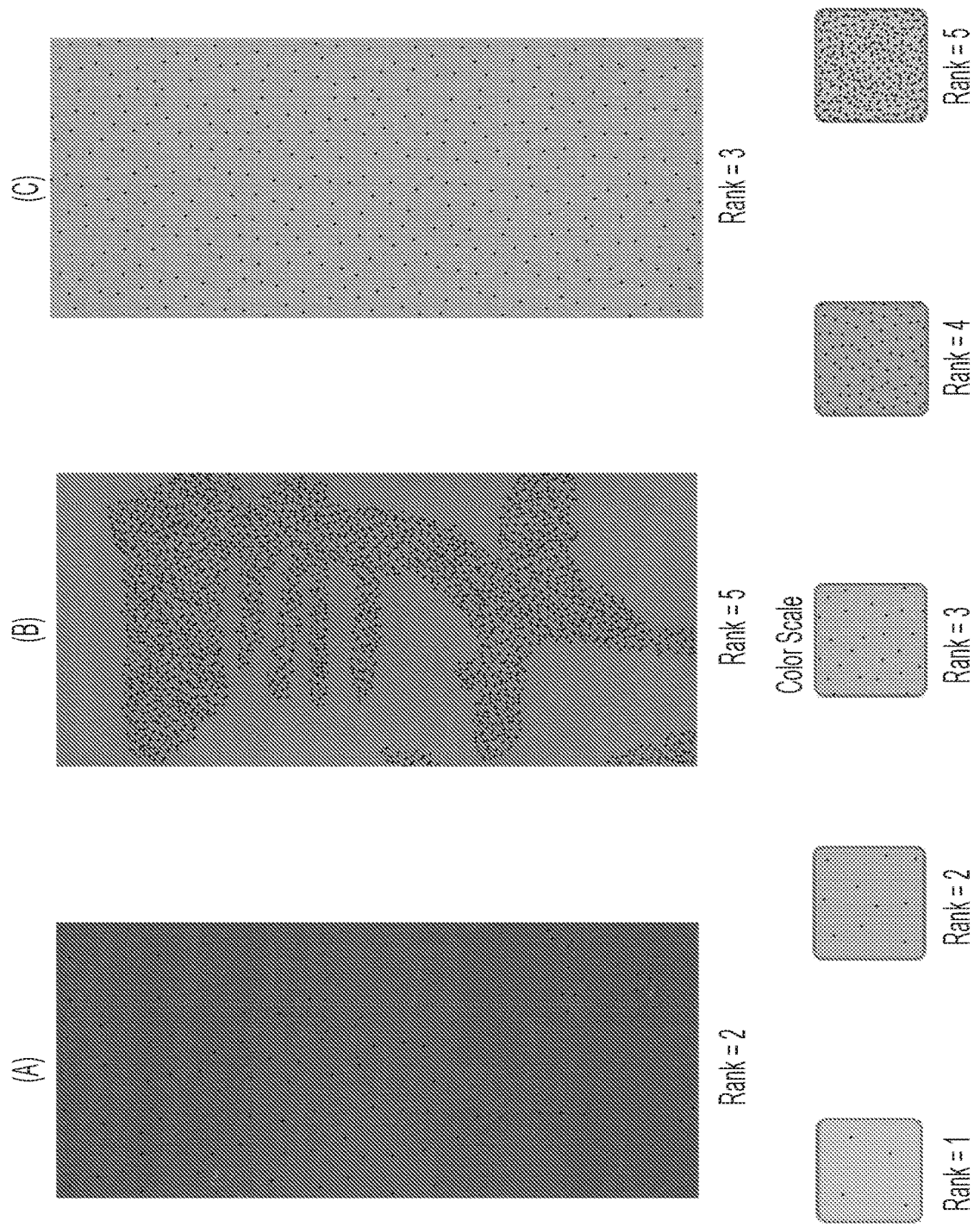
FIGS. 2(A)-2(C) show schematics of the golden coloring overlaid on the panels treated as in Example 2 and shown in FIGS. 1(A)-1(C).

Example 2A: One aluminum 2024-T3 bare substrate measuring 3"×10"×0.032" (Priority Metals, Orange County, CA) was hand-wiped with methyl ethyl ketone (100%) and a disposable cloth twice on each side and was allowed to air dry prior to chemical cleaning. First, the panel was immersed in cleaning Composition #12 for 6 minutes at room temperature with medium agitation. The panel was then spray rinsed for 30 seconds and immersion rinsed for 2 minutes. The rinsed panel was then immersed in a composition comprising Composition #10 for 6 minutes. The panel was then immersed into two separate immersion rinsing tanks for 2 minutes each tank. The panel was then air dried at room temperature until dry to the touch. A grayscale image of the panel is shown in FIG. 1(A). The panel was a bluish color with very little golden coloration. The panel was rated according to the color scale shown in FIGS. 2(A)-2(C). As illustrated in FIGS. 2(A)-2(C), a rank of 1 indicates a panel that exhibits no golden coloration, while a rank of 5 indicates a panel that exhibits a rich golden hue. In FIGS. 2(A)-2(C), the dapple markings illustrate schematically where the golden coloration was on the panel and the density of such coloration. The panel treated in Example 2A was ranked a 2 and is shown in FIG. 2(A).

Example 2B: One aluminum 2024-T3 bare substrate measuring 3"×10"×0.032" (Priority Metals, Orange County, CA) was hand-wiped with methyl ethyl ketone (100%) and a disposable cloth twice on each side and was allowed to air dry prior to chemical cleaning. First, the panel was immersed in SocoMore degreaser (SocoClean A3432) for 10 minutes at 127° F. with medium agitation. The panel was then spray rinsed for 30 seconds and immersion rinsed for 2 minutes. Second, the panel was immersed into SocoMore deoxidizer (SocoSurf A1858/1806) for 6 minutes at room temperature with no agitation. The panel was then carefully dipped into two extra immersion rinsing tanks to remove most of the deoxidizer, and the panel was spray rinsed for 30 seconds followed by an immersion rinse for 2 minutes. The panel was then immersed in Composition #2 for 2 minutes, followed by two separate immersion rinses of 2 minutes each. The panel was immersed into Composition #10 for 2 minutes. The panel was then immersed into two separate immersion rinsing tanks for 2 minutes each tank. The panel was then air dried at room temperature until dry to the touch. A grayscale image of the panel is shown in FIG. 1(B). The panel was rated according to the color scale shown in FIGS. 2(A)-2(C). The panel treated in Example 2B was ranked a 5 and had a rich golden coloration. See FIG. 1(B).

Example 2C: One aluminum 2024-T3 bare substrate measuring 3"×10"×0.032" (Priority Metals, Orange County, CA) was hand-wiped with methyl ethyl ketone (100%) and a disposable cloth twice on each side and was allowed to air dry prior to chemical cleaning. First, the panel was immersed in a deoxidizing solution (17.991% Phosphoric Acid, 24.987% Isopropanol anhydrous, 35.005% Butanol, 22.016% water by mass) for 3.5 minutes. The panel was then spray rinsed until a water-break-free surface is achieved. The panel was then immersed in Alodine 1200s for 2.5 minutes, followed by an immersion rinse of 1 minute and a spray rinse. The panel was then air dried at room temperature until dry to the touch. A grayscale image of the panel is shown in FIG. 1(C). The panel was rated according to the color scale shown in FIGS. 2(A)-2(C). The panel treated in Example 2B was ranked a 3 and had a moderately golden coloration. See FIG. 2(C.)

I claim:

1. A system for treating a metal substrate comprising:
a conversion composition for application to a portion of a surface of the metal substrate, the conversion composition comprising a permanganate anion in an amount of 0.1 g/L to 1 g/L based on total weight of the conversion composition; and
a sealing composition for application to the portion of the surface of the metal substrate following application of the conversion composition, the sealing composition comprising a trivalent chromium cation in an amount of at least 0.01 g/L and no more than 1.0 g/L based on total weight of the sealing composition and a transition metal cation in addition to the trivalent chromium cation in an amount of 0.05 g/L to 5 g/L based on total weight of the sealing composition;
wherein the system excludes a treatment composition for application to the portion of the metal substrate following application of the conversion composition and prior to the sealing composition.

2. The system of claim 1, wherein the conversion composition further comprises at least one coinhibitor comprising a rare earth metal cation present in the conversion composition in an amount of 0.001 g/L to 0.005 g/L based on total weight of the conversion composition and/or a Group IIIB metal cation present in the conversion composition in an amount of 0.001 g/L to 0.005 g/L based on total weight of the conversion composition.

3. The system of claim 1, wherein the sealing composition further comprises an anion suitable for forming a salt with the trivalent chromium cation.

4. The system of claim 1, wherein the transition metal cation in addition to the trivalent chromium comprises a Group IVB metal cation.

5. The system of claim 1, further comprising a cleaning composition.

6. The system of claim 5, wherein the cleaning composition comprises a hydroxide source, a phosphate source, and/or a corrosion inhibitor comprising a metal cation and/or an azole.

7. The system of claim 5, wherein the cleaning composition has a pH of 7 to 13.

8. The system of claim 1, further comprising a deoxidizer.

9. A method of treating a substrate with the system of claim 1, wherein the conversion composition is applied to the portion of the surface of the substrate and then the sealing composition is applied to the portion of the surface of the substrate; wherein the metal substrate is optionally rinsed following application of the conversion composition; and wherein the method excludes application of an additional treatment composition to the portion of the metal substrate following application of the conversion composition and prior to the sealing composition.

10. A substrate obtainable with the system of claim 1.

11. The substrate of claim 10, wherein the substrate:
(a) exhibits at least a 25% reduction in the number of pits on the substrate surface compared to a substrate not treated with the conversion composition and the sealing composition following at least 18 days of exposure in neutral salt spray cabinet operated according to ASTM B1 17 and evaluated according to MIL-C-5541; and/or (b) has fewer than 20 pits following at least 18 days exposure in neutral salt spray cabinet operated according to ASTM B117 and evaluated according to MIL-C-5541.

* * * * *